United States Patent
Schottland et al.

(10) Patent No.: US 11,876,836 B1
(45) Date of Patent: *Jan. 16, 2024

(54) SYSTEM AND METHOD FOR AUTOMATICALLY PRIORITIZING RULES FOR CYBER-THREAT DETECTION AND MITIGATION

(71) Applicant: FireEye Security Holdings US LLC, Milpitas, CA (US)

(72) Inventors: Paul Schottland, Charlotte, NC (US); Chinmoy Dey, Bangalore (IN); Christopher Glyer, Arlington, VA (US)

(73) Assignee: Musarubra US LLC, Plano, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/710,882

(22) Filed: Mar. 31, 2022

Related U.S. Application Data

(63) Continuation of application No. 16/353,988, filed on Mar. 14, 2019, now Pat. No. 11,316,900.
(60) Provisional application No. 62/692,584, filed on Jun. 29, 2018.

(51) Int. Cl.
*H04L 9/40* (2022.01)
*G06F 9/50* (2006.01)

(52) U.S. Cl.
CPC ............... *H04L 63/20* (2013.01); *G06F 9/50* (2013.01); *H04L 63/1416* (2013.01)

(58) Field of Classification Search
None
See application file for complete search history.

(56) References Cited

U.S. PATENT DOCUMENTS

| | | | | |
|---|---|---|---|---|
| 9,521,115 | B1* | 12/2016 | Woolward | H04L 63/0263 |
| 9,560,081 | B1* | 1/2017 | Woolward | G06F 9/45558 |
| 9,787,639 | B1* | 10/2017 | Sun | H04L 63/0263 |
| 2008/0301755 | A1* | 12/2008 | Sinha | H04L 63/20 726/1 |
| 2012/0011560 | A1* | 1/2012 | Natarajan | G06F 21/6218 726/1 |
| 2019/0306118 | A1* | 10/2019 | Guo | H04L 43/18 |
| 2020/0007546 | A1* | 1/2020 | Valiquette | H04L 63/20 |

\* cited by examiner

*Primary Examiner* — Joseph P Hirl
*Assistant Examiner* — Hassan Saadoun
(74) *Attorney, Agent, or Firm* — Rutan & Tucker, LLP

(57) ABSTRACT

A system and computerized method for generating an improved cyber-security rule ordering for cyber-security threat detection or post-processing activities conducted by a rules-based cyber-security engine deployed within a network device is described. Herein, historical metadata associated with analytics conducted on incoming data by a rule-based cyber-security engine and in accordance with a plurality of rules is described. These rules are arranged in a first ordered rule sequence. The historical metadata is analyzed to determine one or more salient rules from the plurality of rules. The plurality of rules are reprioritized by at least rearranging an order to a second ordered rule sequence with the one or more salient rules being positioned toward a start of the second ordered rule sequence. Thereafter, the rule-based cyber-security engine operates in accordance with the reprioritized rule set that is arranged in the second ordered rule sequence to achieve improved performance.

20 Claims, 10 Drawing Sheets

FIG. 2B

| RULE ORDER (RANKING) | RULE WEIGHTING | RULE FREQUENCY | RULE IDENTIFIER | ANALYTIC RULES |
|---|---|---|---|---|
| 1 | W1 | 5 | HASH [R11] | RULE (R11) |
| 2 | W2 | 2 | HASH [R12] | RULE (R12) |
| ⋮ | ⋮ | ⋮ | ⋮ | ⋮ |
| | | | | |
| 1 | W1 | 2 | HASH [R22] | RULE (R22) |
| 2 | W3 | 2 | HASH [R24] | RULE (R24) |
| ⋮ | ⋮ | ⋮ | ⋮ | ⋮ |
| | | | | |
| 1 | W2 | 3 | HASH [R50] | RULE (R50) |
| 2 | W2 | 1 | HASH [R52] | RULE (R52) |
| ⋮ | ⋮ | ⋮ | ⋮ | ⋮ |
| | | | | |
| 1 | W1 | 6 | HASH [R1] | RULE (R1) |
| 2 | W4 | 3 | HASH [R2] | RULE (R2) |
| | | | ⋮ | ⋮ |
| | | | | |
| | | | | |
| | | | | |
| | | | HASH [R10] | RULE (R10) |

FIG. 2C

| RULE ORDER (RANKING) | RULE WEIGHTING | RULE FREQUENCY | RULE IDENTIFIER | ANALYTIC RULES |
|---|---|---|---|---|
| | | | | |
| | | | | |
| | | | | |
| | | | | |
| ///// | ///// | ///// | ///// | ///// |
| | | | | |
| | | | | |
| | | | | |
| | | | | |
| ///// | ///// | ///// | ///// | ///// |
| | | | | |
| | | | | |
| | | | | |
| | | | | |
| ///// | ///// | ///// | ///// | ///// |
| 1 | | | HASH [R8] | RULE 8 (R8) |
| 2 | | | HASH [R7] | RULE 7 (R7) |
| 3 | | | HASH [R4] | RULE 4 (R4) |
| 1 | | | HASH [R3] | RULE 3 (R3) |
| 2 | | | ⋮ | ⋮ |
| ⋮ | | | | |

Rows 1–4 grouped as 275; next group 276; next group 277.
Bottom groups: GEOGRAPHIC 1 OR INDUSTRY 1 (290), GEOGRAPHIC 2 OR INDUSTRY 2 (292), together forming 278.

Column labels: 282, 284, 286, 288, 280. Bottom: $288_R$.

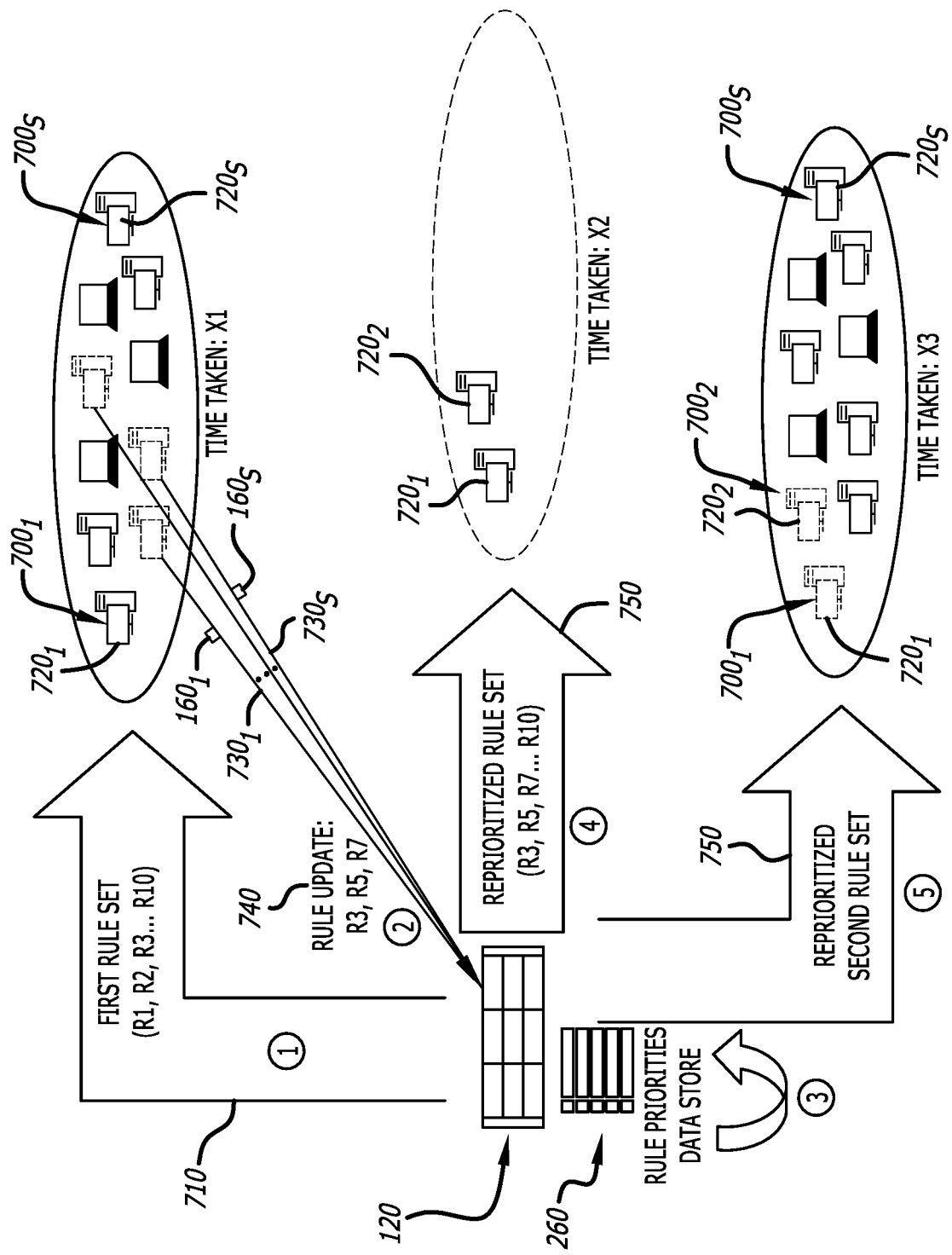

SYSTEM AND METHOD FOR AUTOMATICALLY PRIORITIZING RULES FOR CYBER-THREAT DETECTION AND MITIGATION

CROSS REFERENCE TO RELATED APPLICATIONS

This application is a continuation of U.S. application Ser. No. 16/353,988 filed Mar. 14, 2019 which is based upon and claims the benefit of priority from U.S. Provisional Patent Application No. 62/692,584 filed Jun. 29, 2018, the entire contents of which are incorporated herein by reference.

Embodiments of the disclosure relate to cyber-security. More particularly, one embodiment of the disclosure relates to a system and corresponding method for dynamically reprioritizing the use of analytic rules in controlling cyber-security threat detection to enhance resource utilization and accelerating the review and detection of higher priority artifacts dynamically.

GENERAL BACKGROUND

Network and networked devices provide useful and necessary services that assist individuals in business and in their everyday lives. Given the growing dependence on these services, increased measures have been undertaken to protect the network devices against cyberattacks. In some cases, these cyberattacks are orchestrated in an attempt to gain access to content stored on one or more network devices. Such access is for illicit (i.e., unauthorized) purposes, such as spying or other malicious or nefarious activities that may be achieved through the uploading of malicious software. Other cyberattacks may be directed to adversely influence the operability of a network device such as precluding functionality of the network device or precluding access to certain stored files unless payment is made (ransomware), a forced loading of an unwanted, non-malicious software that utilizes resources within the network device, a loading of spyware in efforts to exfiltrate data (e.g., intellectual property, etc.), or the like.

For protection, network devices (e.g., computer, Internet of Things "IoT" devices, point-of-sale consoles, ATMs, and similar networked and network devices) may be deployed with rule-based cyber-security software that, under control of installed threat detection rules, attempts to detect cyberattacks caused by malicious objects being uploaded. The cyber-security software is coded to perform analytics on received objects, where the order of such analytics is precisely controlled and coincides with the processing order of the threat detection rules. Unfortunately, many conventional rule-based cyber-security software such as a software (e.g., process or daemon) agent operating in the background of a computer for example, the software agent analyzes incoming objects in accordance with a prescribed order of analysis, which is set by the threat detection rules at the time of manufacture and reset during a security content update (e.g., security software update, etc.) Thereafter, the order of analysis is changed infrequently, normally the threat detection rules remain unchanged until a software update is provided to the computer. As a result, some threat detection analyses may not account for recent, real-time findings encountered during cyberattack detection analyses performed to monitor an ever-changing threat landscape.

Currently, this lack of a timely reordering of the detection rules has resulted in inefficient use of analysis resources and concomitant delays in uncovering threats, which is especially true for highly targeted scenarios, wherein a threat actor specifically targets and uses company-specific (rather than generic) software or exploits in software to accomplish the criminals intent against a specific company. In computers, where threat detection must occur during normal operation, any delayed threat detection attributable to legacy rule processing ordering may result in a failure to detect a cyberattack. The failure or delay (even for seconds or less) in detecting a cyberattack may cause irreparable harm to the compromised computer or to the network deploying the computer as the cyberattack may spread to other network devices and resources. For example, once a company's server is effectively infected and controlled by ransomware, then the company's server may have irreparable damage to processes and transactions which were not captured within a backup or other fault tolerance device(s) for the company.

BRIEF DESCRIPTION OF THE DRAWINGS

Embodiments of the disclosure are illustrated by way of example and not by way of limitation in the figures of the accompanying drawings, in which like references indicate similar elements and in which:

FIG. 2B is an exemplary embodiment of a data structure of a rule priorities data store implemented within the management system of FIG. 2A.

FIG. 2C is an exemplary embodiment of a data structure of the rule priorities data store with a rule group further organized into two or more rule subgroups.

FIG. 7 is an illustrative embodiment an operational flow performed by the management system of FIG. 1 in reprioritizing rules controlling operations of a particular cyber-security engine (e.g., software agent) deployed within each of a plurality of network devices.

DETAILED DESCRIPTION

I. Overview

Figure 1:
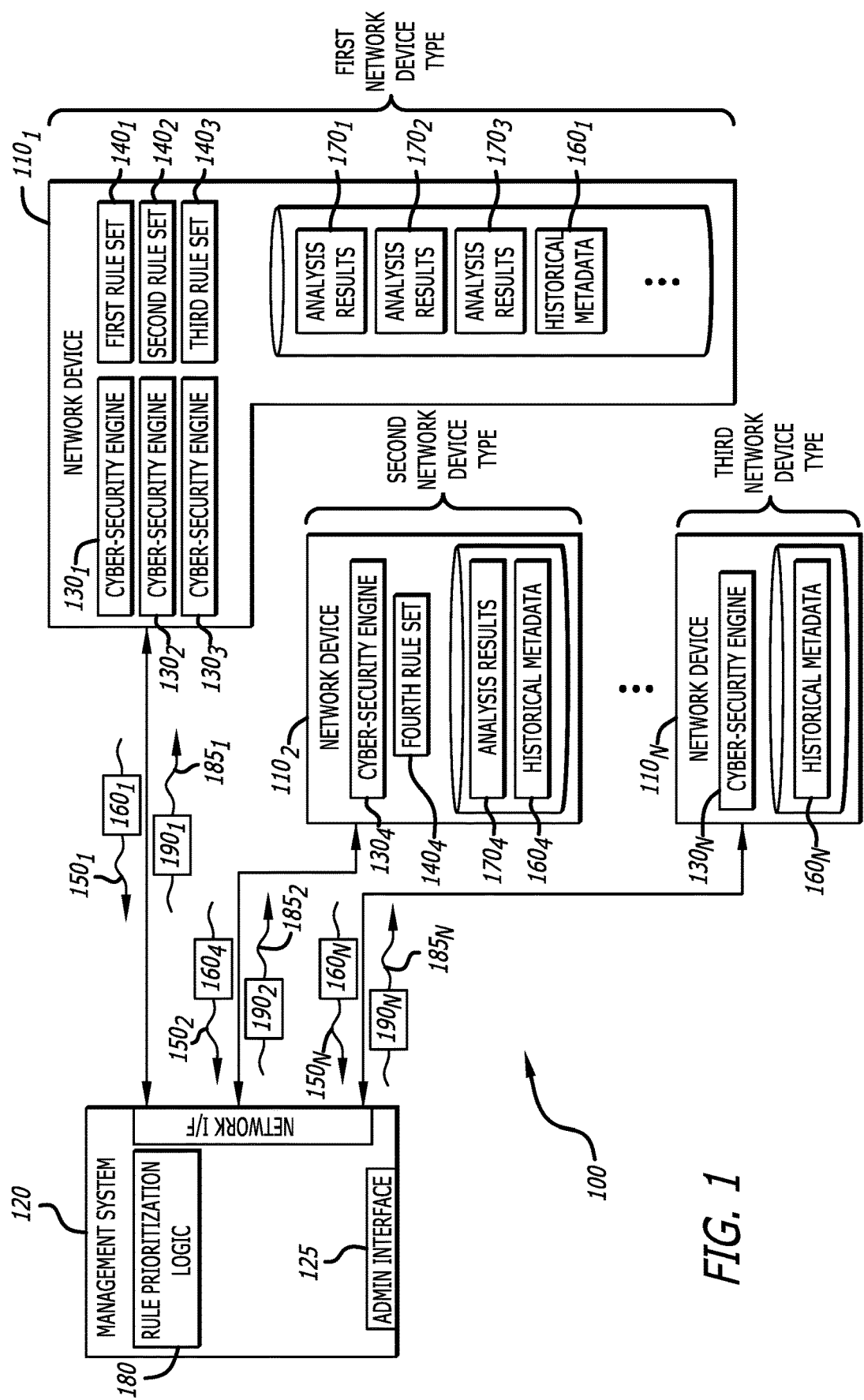
FIG. 1 is an exemplary block diagram of an embodiment of an automated, cyber-security protection service.

A cyber-security system to dynamically reprioritize the utilization of analytic rules forming a rule set with improved efficacy in identifying malicious or non-malicious content and/or improved efficiency in identifying or classifying malicious or non-malicious content is described. Herein, the analytic rules may include detection rules that control operability of threat analysis logic, represented by various types of rule-based cyber-security engines, in (i) detecting one or more indicators of compromise (IOCs) and/or (ii) classifying an object under analysis as malicious (e.g., the likelihood of the object being part of a cyberattack exceeds a first threshold such as a first probability or initial behavioral trigger) or non-malicious (e.g., the likelihood of the object being part of a cyberattack is less than a second threshold such as a second probability that is less than the first probability). The detection rules may be utilized by rule-based cyber-security engines such as a static analysis engine, a dynamic (or behavioral) analysis engine, a correlation/classification engine, a software agent, or the like. Hence, the detection rules may include, but are not restricted or limited to: monitoring rules for targeting certain content within an object for static analysis, static analyzing rules to evaluate maliciousness of an object without its execution, monitoring rules for targeting certain behaviors for behavioral analysis, behavioral analyzing rules to evaluate maliciousness of an object during execution, and/or correlation/classification rules to render a verdict as to whether the object is malicious or non-malicious based on the results provided by the static analysis and/or dynamic analysis.

For illustrative purposes only, one embodiment of the cyber-security system may include logic that analyzes unique binaries executing within an specific customer enterprise and utilizes detection rules and detection rule modification. Another embodiment may involve the evaluation of a binary to other known 'goodware' or 'badware,' while another embodiment could be an application, which is not commonly used to generate a behavior identified as suspicious, each may trigger an evaluation across dimensions which create a unique category of artifact which could be identified as potentially a 'class' of issue which is evaluated for evil (e.g., malicious) or (e.g., non-malicious) intent in an enterprise or specific customer segment, or geography or other segmentation.

Additionally, besides the detection rules described above, the analytic rules may include post-processing rules that control post-processing activities such as (i) controlling the reporting/alerting based on results produced by the rule-based cyber-security engines and/or (ii) performing remediation activities. The post-processing rules may be utilized by rule-based cyber-security engines such as reporting engines, or the like. Hence, the post-processing rules may include, but are not restricted or limited to alert and reporting rules, remediation rules, or the like.

As described herein, a "rule" may be broadly construed as software or data that is used in detection of cyberattacks. According to one embodiment of the disclosure, each rule is configured to specify a conditional logic statement or programmatic entity used in the cyber-security system during operation in detecting and classifying cyberattacks. Rules may be received and maintained by the cyber-security system in files, libraries, directories, or other modular programmatic structures, or may be integrated into logic running within the cyber-security systems for example such as in their operating software. Importantly, in embodiments of the disclosure, these cyber-security rules may be individually modified or a set of rules may be selected and/or modified (reordered, etc.) for use in the cyber-security engine during runtime to adjust operability of the cyber-security engine and influence cyber-security verdicts.

For instance, as one illustrative example, some detection rules may be logic for use in detecting a cyberattack, each capable of being represented as a logical expression for example, an "if this, then that" conditional statement, where "this" represents a condition and "that" represents the conclusion (e.g., an observed characteristic, an observed behavior, a determined classification as malicious or not malicious, etc.). The condition may encompass, for example, a signature, heuristic, pattern, string or value. The conclusion is applied when the condition is satisfied. As another illustrative example, some detection rules may provide configuration information containing parameter values for configuring the operating software of the cyber-security system, such as, for example, threshold values used in detection (e.g., specifying the threshold for suspiciousness and maliciousness).

Different types of analyses may be configured to utilize different types of rule sets. For instance, signature-based rule sets may be used by a static analysis engine to determine whether a hash (or other signature of an event) matches a stored library of signatures (e.g., exploit, vulnerability or fingerprint-type signatures). Likewise, execution anomaly rule sets may be used by a dynamic analysis engine to determine whether, during execution of an object, observed activities and behaviors are expected or anomalous. Also, classification rule sets may be used by a correlation/classification engine to determine verdicts, for example, based on weightings or scores for identified characteristics and behaviors. In addition, post-processing rule sets may include responsive activities that are designed to report/alert a security administrator of a potential cyberattack and/or perform necessary remediation of the object (e.g., quarantine, delete from storage, etc.).

Herein, rule sets may be stored in a rules store (e.g., a repository) in a memory of the cyber-security system (e.g., persistent memory) and the ordering of the rules within the rule sets may be updated (periodically or ad hoc aperiodically) in light of the prevailing threat landscape. The rule reordering may be distributed to the cyber-security systems in security content files or libraries, originating from, for example, a management system charged with optimize analytic rules used by the cyber-security systems. Such rule reordering is different from rule content updates where the content of the rules may change without regard to considering as to how the ordering of the rules effects efficacy and efficiency of the rule set, as described herein with regard to embodiments of the invention.

A "salient" rule denotes a rule that is statistically determinative in (i) effectively identifying or classifying malicious or non-malicious content (efficacy), and/or (ii) improving the effectiveness of the cyber-security engine in identifying or classifying the malicious or non-malicious content relative to the amount of resources expended to achieve that outcome. Hence, this "efficiency" has an inverse relationship with the amount of processing needed to identify or classify content as malicious or non-malicious (e.g., the number of rule analyses, amount of time needed, etc.). A rule is not considered "salient" when it provides minor (little to no) contributions in determining whether content is malicious or non-malicious.

Herein, the above-described dynamic rule reprioritization may involve the re-ordering of analytic rules based on cyber-security intelligence provided from (i) one or more network devices that detected a cyber-security threat (e.g., infected network device that experienced a recent cyberattack, a network device that successfully defended against a cyberattack, etc.), and/or (ii) a network administrator seeking to protect an enterprise against certain cyber-security threats that may be perpetrated against, for example, other companies or other industries. Reprioritization of the analytic rules, especially detection rules for example, may alter the weighting applied to the reordered detection rules within the rule set. Additionally, reprioritization of the analytic rules may be based, at least in part, on cyber-security intelligence pertaining to the frequency and persistence of analytic rules being stored and maintained within a rules priorities data store, as analytic rules relied upon with greater frequency and longevity tend to warrant "salient" designation. Various performance advantages, including resource-use efficiency, detection efficacy and efficiency (speed) in reaching a determination as to whether an object is malicious or non-malicious, may be achieved through the dynamic rule reprioritization scheme described below.

During operation, a cyber-security engine may locally store on its network device (e.g., an endpoint, a cyber-security appliance, a cyber-security sensor, etc.) metadata regarding rules implicated in prior cyber-security threats detected by the cyber-security engine (e.g., historical metadata and/or real-time metadata). In response to a triggering event, the network device may provide the metadata to a remote, centrally located management system containing rule prioritization logic that utilizes the metadata received from such network devices to dynamically reprioritize (e.g., re-order) analytic rules utilized by cyber-security engines similar in type to the cyber-security engine (e.g., software agents, dynamic analysis engine, etc.).

According to one embodiment of the disclosure, the rule prioritization logic is configured to (i) aggregate the (historical) metadata associated with analytics (e.g., results of analyses) conducted by one or more rule-based cyber-security engines of similar type (e.g., software agents, static analysis engines, dynamic analysis engines, or correlation/classification engines, etc.), (ii) analyze the (historical) metadata in light of the current threat landscape (e.g., determine the determinative rules used to correctly reach a genuine verdict being a "true" positive or a "true" negative) to assist in identifying the "salient" analytic rules, and (iii) specify a reprioritization of the analytic rules (e.g., change rule ordering from a first rule sequence to a second rule sequence different than the first rule sequence) for use by the cyber-security engine(s) to optimize future threat analyses (e.g., resource-use efficiency such as a lesser number of rules are needed before a correct, definitive outcome is determined such as whether an object under analysis is malicious or non-malicious, detection efficacy, speed of analysis, etc.). For reprioritization, the salient analytic rules may be re-ordered earlier in the analysis cycle than their previous ordering (e.g., considered at or near the start of each analysis of an object), where the re-ordering of the analytic rules may alter the weighting of such rules (e.g., cause re-weighting). This alteration of the weighting (re-weighting) of the analytic rules, which is caused by the re-ordering of the analytic rules, may have more effect on the determination of whether an incoming object is a cyber-security threat or not. This reprioritization may take into account the probability of a particular threat associated with a rule occurring and the severity of that threat. For illustrative purposes, the analytic rules could come in many forms such as based on a customer's enterprise, or a geography, or an industry vertical; and if the analysis of the binary was determined to be good (e.g., non-malicious) or evil (e.g., malicious) as an artifact, the rules prioritization logic could use any or all of those as inputs to further produce weighting on an ultimate determination of good (e.g., non-malicious) or evil (e.g., malicious).

More specifically, as described below, a system is proposed to improve the efficiency of threat detection based on reprioritizing analytic rules utilized by rule-based cyber-security engines configured to detect and protect against a cyberattack. The system includes a management system communicatively coupled to receive metadata associated with analytic rules utilized by the rule-based cyber-security engines, which may be located within the same network device or different network devices. A rule-based cyber-security engine may be configured to process received analytic rules in efforts to detect indicators of compromise (e.g., suspicious or malicious characteristics or malicious behaviors) or classify analyzed content (e.g., content associated with an object) as malicious or non-malicious. Each rule-based cyber-security engine may include or communicate with scheduling logic, which specifies a prioritization in applying one or more rule sets in an analysis of content based on rule priority messages from the management system.

According to one embodiment of the disclosure, as briefly described above, each rule-based cyber-security engine may be configured to (i) determine what content of an object is to be analyzed, (ii) analyze the content of the object with or without its execution, (iii) determine what behavior or pattern of behaviors of the object are to be analyzed, (iv) analyze the behavior or pattern of behaviors of the object during execution, and/or (v) include also static analysis as an additional layer, and (vi) analyze results of the analyses on the content of the object and/or analyses of the monitored behavior or pattern of behaviors to reach a verdict. These operations are applied in accordance with one or more detection rule sets generated for each cyber-security engine type in efforts to assist the threat analysis logic in reaching a verdict quicker (e.g., less time, lesser number of rules analyzed, etc.). Additionally, one or more of the rule-based cyber-security engine may be configured with post-processing rule sets to determining a reporting procedure and/or types of alerts based on results produced by one of the rule-based cyber-security engines and/or perform remediation activities such as quarantine or delete content determined to be malicious. In general, these rule sets are directed to cyber-security threat analyses.

As described below, one type of network device, referred to as "endpoint," includes threat analysis logic implemented as a cyber-security engine configured as a software agent that, upon execution on the endpoint, may be adapted to identify malicious (or non-malicious content) and/or reach a verdict as to whether the object is a cyber-security threat. The network device may include The software agent further provides metadata, namely the results of its analyses conducted in accordance with current analytic rules, to the rule prioritization logic deployed within the management system. The rule prioritization logic analyzes the metadata (and metadata from any other cyber-security engines of similar type) and returns information identifying changes in prioritization of the current analytic rules.

Herein, the information identifying changes in prioritization of the current analytic rules is returned to the endpoint (and potentially other endpoints) as multicast or unicast messaging. Upon receipt of such information, scheduling logic within the endpoint effects reprioritization of the analytic rules (e.g., re-ordering into a different ordered sequence and/or re-weighting) for subsequent analyses. The reprioritization of the analytic rules utilized by the cyber-security engine(s) enables the more efficient analysis of content associated with an object by reducing the number of analysis cycles (e.g., number of rules being analyzed, amount of analysis time. etc.) necessary in identifying the content as malicious or non-malicious.

Different from an endpoint deployment, a cyber-security appliance may include threat analysis logic represented as multiple rule-based cyber-security engines. One type of rule-based cyber-security engine operates as a static analysis engine that, upon execution on the appliance, performs light-weight examinations of each incoming object to determine whether the incoming object is suspicious and/or malicious. These examinations may include a variety of different static analyses, where order of the analyses is controlled by the rule ordering that may be dependent on the type of object analyzed, such as a PDF document, Microsoft® WORD® document, an electronic mail (email) message, or the like. Additionally, or in the alternative, the static analysis engine may employ analysis techniques, including the use of application of heuristics or pattern matching, in order to detect and subsequently report or remediate unrecognizable (e.g., unknown) or known, malicious characteristics with or without execution of the object.

Herein, a change in prioritization of the analytic rules utilized by a static analysis engine may involve a change in the order of operations conducted during heuristics or the order of the patterns evaluated by the static analysis engine. The static analysis engine may include or cooperate with a correlation/classification engine, which may operate to reach a verdict as to whether the object is suspicious (e.g., a potential cyber-security threat) or benign based on results of the examination/detection. Suspicious objects may be provided for further analysis. In some embodiments, the correlation/classification engine may also determine whether the object is malicious, and, if so determined, may initiate an alert to a security administrator and discontinue further analysis or, in another embodiment (or pursuant to applicable analytic rules) proceed with further analysis. In some embodiments, when the correlation/classification engine classifies an object as benign, the object is subjected to no further analysis and thus "filtered" from further analysis, while in other embodiments all objects undergo the further analysis with all results of the plural analyses factored into an overall maliciousness determination, as further determined below. The operability of the static analysis engine as well as the correlation/classification engine are controlled by corresponding rule sets.

Another type of rule-based cyber-security engine operates as a dynamic analysis engine that, upon execution on the appliance, observes and examines behavior(s) of the object during run-time of a network device. A change in prioritization of the analytic rules may involve a change in the order of the monitoring and/or processing activities conducted on incoming objects being evaluated by the dynamic analysis engine. According to one embodiment of the disclosure, the dynamic analysis engine may not generally wait for results from the static analysis engine. However, in another embodiment, results of previously performed static analysis may be used to determine whether the dynamic analysis is performed. The processing activities of the object may be observed (e.g., captured) by monitors having access to a run-time environment (e.g., virtual machine) within the network device and another cyber-security engine, referred to as a correlation/classification engine, may operate to reach a verdict as to whether the object is a cyber-security threat based on results provided by the static analysis engine and the dynamic analysis engine. The operability of the static analysis engine, the dynamic analysis engine and/or monitors (all different types of cyber-security engines) are controlled by corresponding rule sets.

According to one embodiment of the disclosure, each network device, on behalf of a corresponding cyber-security engine (e.g., static analysis engine, the dynamic analysis engine, correlation/classification engine, and/or monitors) provides results of the analyses in accordance with the current analytic rules (e.g., the metadata) to the rule prioritization logic deployed within the management system. The rule prioritization logic analyzes the metadata (and metadata from any other similar cyber-security engines) and, when applicable, determines a reprioritization of the analytic rules specifying a new rule order of processing to improve performance of the cyber-security engine. This reprioritization is conveyed by one or more rule priority messages communicated to the network devices, where the priority messages may operate as an entire rule replacement of the current analytic rules provided in or specifying a new rule order of processing, or may identify changes to the current analytic rules (or their priority (order)) utilized by the corresponding cyber-security engine.

In lieu of returning the rule priority messages as a multicast transmission to all similarly situated cyber-security engines, the management system may be configured to receive metadata relating to the processing of the detection rules by a group of cyber-security engines operating on different network devices, and, after analysis of the metadata, generates and distributes a priority message (containing the proposed rule reprioritization) to each cyber-security engine of a subgroup of cyber-security engines (i.e., a subgroup being lesser in number than the group of cyber-security engines) for testing. In some embodiments, different subgroups may be assigned based on the characteristics of the customer (different types of customers may be subject to different threats). Initially, different subgroups may be assigned different rule orderings; however, the rules may be consistent across subgroups though the order in which they are processed may vary. During processing of an object by one or more rule-based cyber-security engines, data associated with the efficacy of the various rule orderings is collected and provided to the management system.

The management system assesses the data, and based on the assessment, generates a proposed optimal ordering. In some embodiments, the optimal orderings may be generated and distributed to either the same subgroup or newly generated subgroup. According to one embodiment, the cyber-security engine (e.g., software agent) would apply both the then current rule ordering and a proposed optimal ordering, and generate meta-information associated with their processing. The meta-information would be communicated to the management system and, if determined to be an improvement over the then current rule ordering, the proposed optimal ordering may replace current rule ordering.

Similarly, the results may be used to generate a new proposed optimal ordering responsive to this additional information.

In particular, if the rule reprioritization is effective (e.g., achieves enhance resource-use efficiency, detection efficacy, and/or increased analysis speed in reaching a verdict), the management system sends the priority messages to the entire group of cyber-security engines (or remaining cyber-security engines of the group of cyber-security engine). Otherwise, if further adjustments in the order are needed, one or more iterations of the transmission of priority message and subsequent testing may be performed.

The rule prioritization logic of the management system can be invoked periodically or aperiodically to adjust the order of processing of the rules by one or more cyber-security engines. For example, this update process may commence in response to a timed triggering event to occur daily, or based on "time-since-last" update and/or other factors. Another factor may be "time to verdict" information, as monitored by the endpoint and included in the metadata. "Time to verdict" may be expressed in various ways, including length of time the detection needed prior to reaching a definitive verdict, or the number of rules required to be processed before reaching a definitive verdict, or other statistical methods such as average number of rules required to be applied to reach verdicts over a prescribed number of detections. The verdict may indicate whether or not the cyber-security system has detected indicators of compromise signaling a potential cyberattack or, in other words, malicious or benign activities. Alternatively, the update process may commence in response to the size of the metadata gathered by the cyber-security engine.

II. Terminology

In the following description, certain terminology is used to describe various features of the invention. For example, each of the terms "logic," "engine," "system," and "component" may be representative of hardware, firmware or software that is configured to perform one or more functions. As hardware, the term "logic" (or engine or system or component) may include circuitry having data processing and/or storage functionality. Examples of such circuitry may include, but are not limited or restricted to a hardware processor (e.g., microprocessor, one or more processor cores, a digital signal processor, a programmable gate array, a microcontroller, an application specific integrated circuit "ASIC", etc.), a semiconductor memory, or combinatorial elements.

Additionally, or in the alternative, the logic (or engine or system or component) may include software such as one or more processes, one or more instances, Application Programming Interface(s) (API), subroutine(s), function(s), applet(s), servlet(s), routine(s), source code, object code, shared library/dynamic link library (dll), or even one or more instructions. This software may be stored in any type of a suitable non-transitory storage medium, or transitory storage medium (e.g., electrical, optical, acoustical or other form of propagated signals such as carrier waves, infrared signals, or digital signals). Examples of a non-transitory storage medium may include, but are not limited or restricted to a programmable circuit; non-persistent storage such as volatile memory (e.g., any type of random access memory "RAM"); or persistent storage such as non-volatile memory (e.g., read-only memory "ROM", power-backed RAM, flash memory, phase-change memory, etc.), a solid-state drive, hard disk drive, an optical disc drive, or a portable memory device. As firmware, the logic (or component) may be stored in persistent storage.

The term "message" generally refers to signaling (wired or wireless) as either information placed in a prescribed format and transmitted in accordance with a suitable delivery protocol or information made accessible through a logical data structure such as an API. Hence, each message may be in the form of one or more packets, frames, or any other series of bits having a prescribed, structured format.

The term "object" generally relates to information having a logical structure or organization for malware analysis. The information may include an executable (e.g., an application, program, code segment, a script, dll or any file in a format that can be directly executed by a computer such as a file with an ".exe" extension, etc.), a non-executable (e.g., a file; any document such as a Portable Document Format "PDF" document; a word processing document such as Word® document; an electronic mail "email" message, web page, etc.), or simply a collection of related data (e.g., packets).

The term "computerized" generally represents that any corresponding operations are conducted by hardware in combination with software and/or firmware. The term "data store" generally refers to a data storage device such as the non-transitory storage medium described above, which provides non-persistent or persistent storage for the information (e.g., events).

According to one embodiment of the disclosure, the term "threat" may be broadly construed as any code, communication or activity that initiates or furthers a cyberattack. A threat may prompt or cause unauthorized, anomalous, unintended and/or unwanted behavior(s) or operations constituting a security compromise of information infrastructure. For instance, the threat may involve malicious software ("malware"), which is a type of malicious computer code that, as an illustrative example, executes an exploit to take advantage of a vulnerability in a network, network device or software, to gain unauthorized access, harm or co-opt operations of the network, the network device or the software, or to misappropriate, modify or delete data. Alternatively, as another illustrative example, the threat may correspond to information (e.g., executable code, script(s), data, command(s), etc.) that is designed to cause a network device to experience anomalous (unexpected or undesirable) behavior(s). The anomalous behavior(s) may include a communication-based anomaly or an execution-based anomaly, which, for example, could (1) alter the functionality of a network device executing application software in an unauthorized or malicious manner; (2) alter the functionality of the network device executing that application software without any malicious intent; and/or (3) provide unwanted functionality which may be generally acceptable in another context.

The term "network device" may be construed as either a physical electronic device featuring data processing and/or network connection functionality or a virtual electronic device being software that virtualizes certain functionality of the physical network device. The network may be a public network such as the Internet and/or a local (private) network such as an enterprise network, a wireless local area network (WLAN), a local area network (LAN), a wide area network (WAN), or the like. Examples of a network device, which may be deployed as a physical or virtual electronic device, may include, but are not limited or restricted to an endpoint such as computer system such as a workstation or server, ATM, point of sale systems, internet of things (IoT) devices, a standalone cyber-security appliance, an intermediary communication device (e.g., router, firewall, etc.), a virtual machine, or any other virtualized resource.

An "endpoint" generally refers to a physical or virtual network device equipped with a software image (e.g., operating system "OS", one or more applications), and a software agent to capture processing events (e.g. tasks or activities) in real-time for threat detection or cyber-security investigation. Embodiments of an endpoint may include, but are not limited or restricted to a laptop, a tablet, a netbook, a server, a video game console, a set-top box, a device-installed mobile software, a smartphone, wearable, or other physical or virtual devices typically utilized by a consumer.

The term "transmission medium" may be construed as a physical or logical communication path between two or more network devices or between components within a network device. For instance, as a physical communication path, wired and/or wireless interconnects in the form of electrical wiring, optical fiber, cable, bus trace, or a wireless channel using radio frequency (RF) or infrared (IR), may be used. A logical communication path may simply represent a communication path between two or more network devices or between components within a network device such as one or more Application Programming Interfaces (APIs).

Finally, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

As this invention is susceptible to embodiments of many different forms, it is intended that the present disclosure is to be considered as an example of the principles of the invention and not intended to limit the invention to the specific embodiments shown and described.

III. General Architecture

A. Cyber-Security Protection Service

Referring to FIG. 1, an exemplary block diagram of an embodiment of an automated, cyber-security protection service 100 is shown. Herein, the cyber-security protection service 100 includes one or more network devices $110_1$-$110_N$ (N≥1), which are communicatively coupled to a management system 120. Each network devices $110_1$ ... or $110_N$ includes one or more cyber-security engines $130_1$-$130_M$ (M≥1), which are configured to detect and protect the network device $110_1$ ... or $110_N$ against the threat of a cyberattack. As shown, one type of network device (e.g., network device $110_1$ operating as a cyber-security appliance) may deploy multiple cyber-security engines $130_1$-$130_3$ that assist in threat detection and/or mitigation while another type of network device (e.g., network device $110_2$ operating as an endpoint) may deploy a single cyber-security engine $130_4$. The management system 120 may be located within the same proprietary network as the network devices $110_1$-$110_N$ (e.g., endpoints and/or appliances within an enterprise network of a customer) or may be remotely located and provided as a private or public cloud service.

As described herein, operating in accordance with an assigned set of analytic rules, each cyber-security engine $130_1$ ... or $130_M$ is configured to assist in the analysis of incoming objects to determine whether such objects are cyber-security threats (e.g., "malicious" denoting part of a cyberattack). Given that different types of cyber-security engines perform different operations, the analytic rule sets associated with these cyber-security engines are composed of different rules and different rule combinations. For example, depending on the type of cyber-security engine, an analytic rule set may be organized to (i) control analyses of content associated with incoming objects and prioritize the analyses, (ii) prioritize selection of monitors that are responsible for gathering information associated with the behavior(s) by either the incoming object or by the software executing the object being monitored during execution, (iii) control and prioritize analyses associated with the gathered information associated with the monitored behavior(s), or (iv) control and prioritize analytics of the results from the analyses of the content associated with the objects and/or from the analyses of the gathered information associated with the monitored behavior(s). The prioritization may involve the re-ordering of the rules controlling the analyses (or monitor selection) being conducted automatically. However, in some embodiments, the ordering of the analytic rules controlling the analyses may be based on administrator input and/or received (historical) metadata. The order of the analyses (or selection) may further differ for each object type, e.g., PDF, document, executable.

As further shown in FIG. 1, each of the network devices $110_1$-$110_N$ may correspond to the same or different types of network devices. For instance, a first network device $110_1$ may correspond to a cyber-security appliance while a second network device $110_2$ may correspond to an endpoint or multiple endpoints. For the cyber-security appliance $110_1$, the threat analysis logic represents a plurality of cyber-security engines $130_1$-$130_3$ may be deployed therein. For instance, according to one embodiment of the disclosure, the plurality of cyber-security engines $130_1$-$130_3$ forming the threat analysis logic may include at least (i) a static analysis engine $130_1$, (ii) a dynamic analysis engine $130_2$, and/or (iii) a correlation/classification engine $130_3$. Each of these cyber-security engines $130_1$-$130_3$ may be under control of a different set of analytic rules (rule set), which may be evaluated and reprioritized by the management system 120.

More specifically, the first cyber-security engine $130_1$ (e.g., static analysis engine $130_1$), upon execution on the cyber-security appliance $110_1$, is configured to perform light-weight examinations of incoming objects to determine whether such objects are associated with a cyber-security threat. The examinations, conducted in according with a first rule set $140_1$, may involve statistical analysis techniques, such as heuristics or pattern correlation, to analyze the content of objects under analysis without execution of these objects.

According to one embodiment of the disclosure, a change in prioritization (ordering) of the first rule set $140_1$ may alter the ordering of operations performed by the static analysis engine $130_1$. The ordering alteration may be directed to a change in the ordering of the statistical analysis techniques (heuristics, pattern correlation, etc.) or may be directed to a change in the ordering of known malicious and/or benign patterns being evaluated with content of the objects by the static analysis engine $130_1$. According to another embodiment of the disclosure, a change in prioritization of the first rule set $140_1$ may alter weightings associated with certain rules within the first rule set $140_1$, and thus, may have a particular impact on the efficiency of identifying whether an object is malicious or non-malicious. The weighting may correspond to the severity of a rule violation as measured by the first cyber-security engine $130_1$ or another cyber-security engine, such as the correlation/classification engine $130_3$ for example, operating in concert with the first cyber-security engine $130_1$. Hence, the weighting alteration may be used to identify which of the analytic rules are salient in the analysis, where the higher weighted rules may also be performed first when the static analysis engine $130_1$ is evaluating the content within the incoming objects.

A second cyber-security engine $130_2$ (e.g., dynamic analysis engine $130_2$), upon execution on the appliance $110_1$, is configured to observe and analyze processing activities (e.g., behaviors) of incoming objects that occur during run-time and/or applications executing such objects. The analysis of these behaviors is conducted in accordance with a second rule set $140_2$, which is different from the first rule set $140_1$. Hence, the ordering in the observations and analyses of the behaviors by the dynamic analysis engine $130_2$ would be altered in response to a reprioritization of the second rule set $140_2$. In one embodiment, the dynamic analysis engine $130_2$ may not generally wait for results from the static analysis engine $130_1$ so that the dynamic analyses are performed concurrently (e.g., at least partially overlapping in time) with the static analyses. However, in another embodiment, results of a previously performed static analysis may determine whether a subsequent dynamic analysis is performed, and, in some embodiments, if performed, the rules to prioritize, e.g., which monitors to activate and captured behaviors are more probative.

Additionally, a cyber-security engine $130_3$ may be configured as a correlation/classification engine that, upon execution on the appliance $110_1$, is adapted to reach a verdict as to whether the object is a cyber-security threat. Operating in accordance with a third rule set $140_3$, the correlation/ classification engine $130_3$ determines, based on results from analyses conducted by the static analysis engine $130_1$ and/or the dynamic analysis engine $130_2$, a verdict associated with an object under analysis. Therefore, a change in the third rule set $140_3$ may alter the priority (e.g., order in processing) of specific analyses being conducted by the correlation/ classification engine $130_3$ on the analysis results produced by other cyber-security engines (e.g., static analysis engine $130_1$ and/or dynamic analysis engine $130_2$). By reprioritizing the analytic rules forming the third rule set $140_3$, the correlation/classification engine $130_3$ may perform analyses in accordance with selected "salient" threat detection rules of the third rule set $140_3$ (as determined by the administrator and/or metadata) earlier than previous analyses. The location for where each of these analysis engines run is provided for illustrative purposes as an example of a possible architecture. Hence, any or all of these analysis engines could run in any part of the cybersecurity-architecture.

Although not described in detail, the behaviors of the object may be observed (e.g., captured) by monitors. Therefore, a change in the ordering of the monitor activations (or the type of monitors activated) may alter the ordering in the observation and analysis of the behaviors associated with the object (or executing application) by the dynamic analysis engine $130_2$.

In the case of the endpoint $110_2$ for example, the threat analysis logic may be represented as a cyber-security engine $130_4$, namely a software agent that, upon execution on the endpoint $110_2$, is configured to reach a verdict as to whether an object under analysis is a cyber-security threat. The software agent $130_4$ analyzes the object in accordance with a fourth rule set $140_4$. Hence, as similarly described above, a change in the fourth rule set $140_4$ may alter the priority (e.g., order) of the analyses of an object conducted by the software agent $130_4$. As a result, the software agent $130_4$ performs analyses in accordance with selected "salient" rules (as determined by the administrator and/or metadata) prior to analyses conducted in accordance with non-salient rules.

Besides the detection rules described above, the postprocessing rules (e.g., rules directed to reporting or issuing alerts and/or remediation rules may be prioritized). For example, reporting rules (not shown) may specify, depending on the threat landscape (e.g., prevailing at a point of time in the industry) that certain types of discovered cyberattacks should be accorded an "urgent" alert, needing immediate remediation. Such "urgent" alerts may involve transmission through a particular type of communication that tends to solicit immediate attention (e.g., text message, automated phone call, screen display generated and rendered on a security administrator's computer, etc.) or via multiple types of communications sent concurrently or at least close in time (e.g., less than 30 seconds apart). Less urgent alerts may involve placement of the alerts into a record that may be accessed by the security administrator during her or his normal course of business.

Referring still to FIG. 1, depending on the network device type, each network device $110_1$ . . . or $110_N$ may be configured to provide one or more priority control messages $150_1$-$150_N$ to rule prioritization logic 180 deployed within the management system 120. Each priority control message, such as priority control message $150_1$ for example, may be configured to provide metadata $160_1$ (e.g., historical metadata) based on one or more analysis results $170_1$-$170_4$ performed by corresponding cyber-security engines $130_1$-$130_3$ (e.g., static analysis engine $130_1$, the dynamic analysis engine $130_2$, and/or correlation/classification engine $130_3$) to the management system 120. As another example, priority control message $150_2$ may be configured to provide metadata $160_2$ (e.g., historical metadata) based on analysis results $170_5$ performed by cyber-security engine $130_5$ (e.g., software agent $130_5$) to the management system 120. Herein, the metadata $160_1$-$160_N$ may include information associated with the results from analyses of rules forming analytic rule sets that control functionality of cyber-security engine(s) operating within the network devices $110_1$-$110_N$. Examples of the metadata $160_1$-$160_N$ may include, but are not limited or restricted to (i) identifiers associated with each rule involved in a successful detection, normally a genuine detection (e.g., true positives and true negatives) to avoid promoting false positive or false negative detection such as a hash value(s) of the rules, and this portion could include multiple sources which could determine "true positive" (TP) or "true negative" (TN) and the system can arbitrate or include both as inputs to be weighed; (ii) an identifier for the object (e.g., file name, etc.), (iii) a source address of the object (e.g., Internet Protocol "IP" address), (iv) a destination address for the object, (v) a hash of the object, and/or (vi) any uniform resource locators (URLs) associated with the object.

According to one embodiment of the disclosure, the rule prioritization logic 180 analyzes the metadata $160_1$-$160_N$ and generates one or more rule priority messages $185_1$-$185_N$ responsive to priority control messages $150_1$-$150_N$. The management system 120 returns the rule priority messages $185_1$-$185_N$ to the network devices $110_1$-$110_N$. Each rule priority message $185_1$ . . . , or $185_N$ may include rule recommendations $190_1$ . . . , or $190_N$, respectively. Each rule recommendation $190_1$ . . . , or $190_N$ corresponds to information that identifies changes in prioritization of rules within one or more analytic rule set(s) that control one or more cyber-security engines deployed within a particular type of network device $110_1$ . . . , or $110_N$.

According to one embodiment of the disclosure, the rule recommendations $190_1$-$190_N$ may be generated (i) automatically (and in real-time) by the rule prioritization logic 180 based on the metadata $160_1$-$160_N$ and/or (ii) manually by an analyst or administrator relying on experiential knowledge. The generation of the rule recommendations $190_1$-$190_N$ may involve removal of, modification, or addition to the salient rules associated with the current rule set(s) implemented within the submitting network device $110_1$-$110_N$ based, at least in part, on the provided metadata $160_1$-$160_N$. However, the changes to the current rule set may be based on administrator selections provided via an administrator interface 125 within the management system 120. The rule recommendations $190_1$-$190_N$ are adjusted to reprioritize a rule set cyber-security engine.

As an illustrative example, the removal, modification or addition to a rule set (e.g., fourth rule set $140_4$) may be accomplished by issuance of the rule priority messages $185_2$. The rule priority message $185_2$ may include changes to the fourth rule set $140_4$ that may be performed by a scheduling logic or other logic within the cyber-security engine $130_2$. These changes may include changes in the ordering of rules within the fourth rule set $140_4$, changes to weightings within certain rules within the fourth rule set $140_4$ utilized by the cyber-security engine $130_2$.

One or more of the cyber-security engines $130_1$-$130_M$ (e.g., cyber-security engine $130_1$) may be deployed on-premises to detect and analyze objects propagating into or through the local network 115 to determine whether such objects are associated with a cyberattack. For instance, the cyber-security engines $130_1$-$130_3$ may operate within one or more cyber-security appliances that are installed within the local network 115 as edge network device(s), which generally operates as an endpoint within the local network 115.

Alternatively, although not shown in FIG. 1, each of the cyber-security systems $130_1$-$130_6$ may be deployed as a cloud-based solution in which the objects (or a representation thereof) are captured at the local network 115 and submitted to at least one of the cloud-based cyber-security systems $130_1$-$130_6$. Furthermore, although not shown in FIG. 1, at least one of the cyber-security systems $130_1$-$130_6$ (e.g., cyber-security system $130_4$) may be deployed at an endpoint as a software agent operating in the background to analyze and monitor for certain behaviors by the object.

B. Management System

Figure 2A:
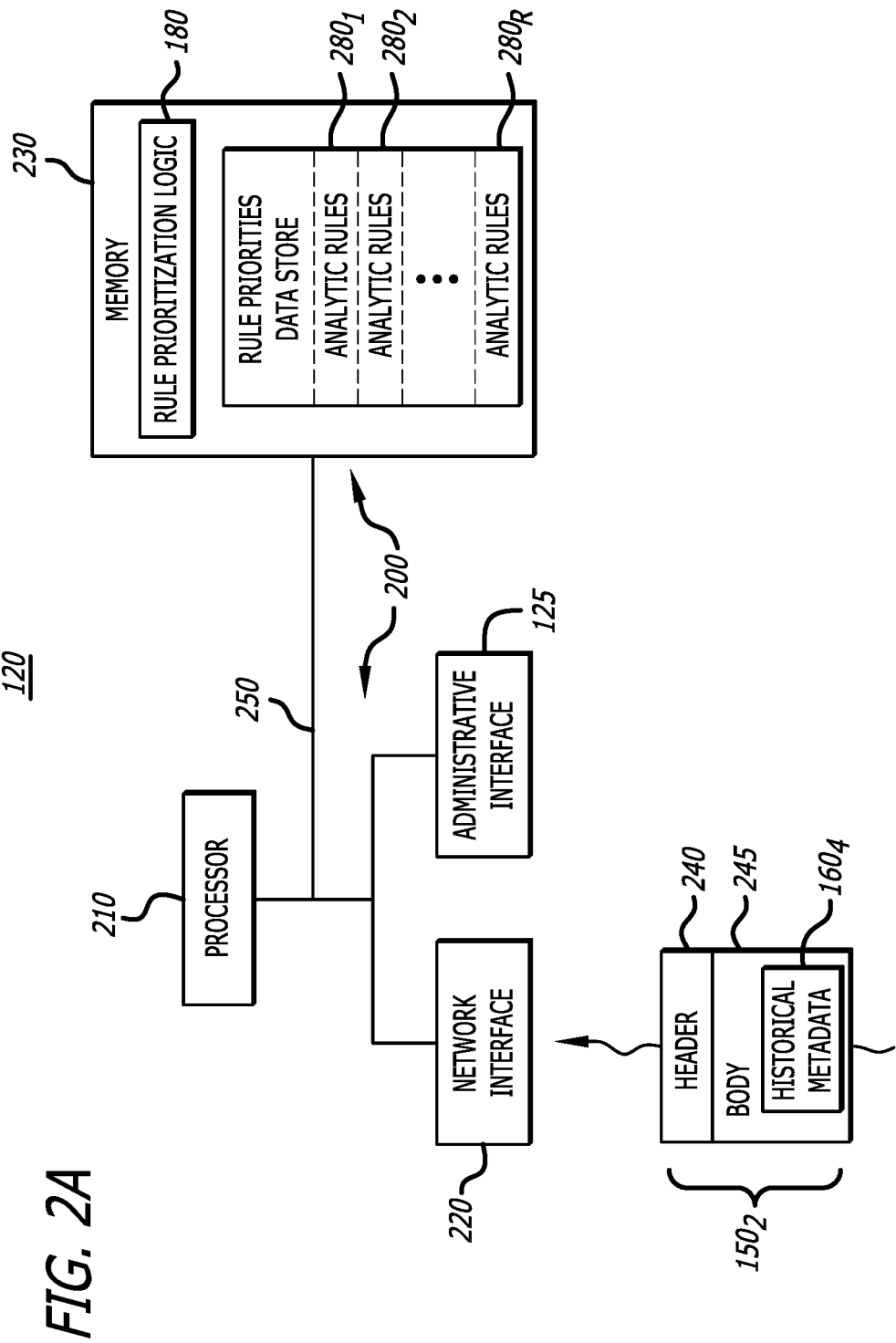
FIG. 2A is an exemplary embodiment of a logical representation of the management system deployed as part of the cyber-security protection service of FIG. 1.

Referring now to FIG. 2A, an exemplary embodiment of a logical representation of the management system 120 of FIG. 1 is shown. Herein, the management system 120 includes a plurality of components 200, including a processor 210, a network interface 220, a memory 230, and/or an administrative (I/O) interface 125, which are communicatively coupled together via a transmission medium 250. As shown, when deployed as a physical device, the components 200 may be at least partially encased in a housing (not shown) made entirely or partially of a rigid material (e.g., hardened plastic, metal, glass, composite, or any combination thereof) to protect these components 200 from environmental conditions. As a virtual device, however, the management system 120 is directed to some or all of the logic within the memory 230.

The processor 210 is a multi-purpose, programmable component that accepts digital data as input, processes the input data according to stored instructions, and provides results as output. One example of a processor may include a central processing unit (CPU) with a corresponding instruction set architecture. Alternatively, the processor 210 may include another type of CPU, a digital signal processor (DSP), an Application Specific Integrated Circuit (ASIC), a field-programmable gate array (FPGA), or the like.

As shown in FIG. 2A, the processor 210 is communicatively coupled to the memory 230 via the transmission medium 250. According to one embodiment of the disclosure, the memory 230 is adapted to store (i) rule prioritization logic 180 and (ii) rule priorities data store 260. Herein, the rule prioritization logic 180 can be invoked periodically or aperiodically to determine whether any adjustment of an analytic rule set is warranted in efforts to improve operability of any of the network devices $110_1$-$110_N$ of FIG. 1. For example, a rule update process involving the rule prioritization logic 180 may be triggered to occur daily, or based on "time-since-last" update and/or other factors. Another factor may be "time to verdict" information, as monitored by network device $110_2$ and included in part of the metadata $110_2$. "Time to verdict" may be expressed in various ways, including (i) the amount of time utilized by one or more cyber-security engines to reach a definitive verdict, (ii) the number of rules processed in reaching the definitive verdict, or (iii) other statistical methods such as average number of rules utilized over a prescribed number of detections. The verdict may indicate whether or not the cyber-security engine has detected indicators of compromise signaling a cyber-security threat or, in other words, potential malicious or benign activities.

More specifically, the rule prioritization logic 180 parses an incoming priority control message (e.g., priority control message $150_2$) received from a network device (e.g., network device $110_2$) via the network interface 220. Such parsing may extract data from a header 240 of the priority control message $150_2$ to identify a sender of the priority control message $150_2$. Where the sender is a subscriber of the cyber-security protection service 100, the software profile of the subscriber may be referenced and content from the software profile may be utilized in the reprioritization of one or more rule sets as described below and illustrated in FIG. 7. The parsing may extract data from a body 245 of the priority control message $150_2$, which may include metadata $160_4$ (based on prior threat detection analyses performed by software agent $130_2$). Based on the metadata $160_2$ in combination with analysis results received from any other endpoints including software agents, the rule prioritization logic 180 determines whether reprioritization of a rule set utilized by at least the software agent $130_4$ is needed in order to reduce the number of rules needed to be processed before a determination can be made whether the message is malicious or non-malicious, thereby increasing the efficiency of the software agent (and other software agents within the cyber-security protection service 100 of FIG. 1).

Referring now to FIG. 2B, an illustrative embodiment of the data structure of the rule priorities data store 260 is shown. Herein, the rule priorities data store 260 includes storage locations $270_1$-$270_R$ (R≥2) to collectively maintain analytic rules 280 (e.g., rules $280_1$-$280_R$) relied upon by the cyber-security engines $130_1$-$130_N$ in detected indicators of compromise associated with a suspect object signaling a potential cyber-security threat as described above. As shown, according to this embodiment of the disclosure, each of the storage locations $270_1$-$270_R$ includes analytic rules 280 along with metadata pertaining to each of these analytic rules 280 such as rule orderings (rankings) 282, rule weightings 284, frequencies of reporting 286, and identifiers (e.g., hash values) 288.

Given that different type of cyber-security engines utilize different analytic rules, the storage locations $270_1$-$270_R$ may be organized into groups of rules based on cyber-security engine type. As shown, for illustrative purposes this rule grouping includes four (4) rule groups 275-278, each representing a different type of cyber-security engine (e.g., static analysis engine $130_1$, dynamic analysis engine $130_2$, correlation/classification engine $130_3$, and software agents $130_4$). The fourth rule group 278 includes at least the fourth rule set $140_4$, as the number of rules in the fourth rule set $140_4$ being utilized by the software agent $130_1$ of the second network device $110_2$ may be less than the number of rules forming the fourth rule group 278 that are available for use by software agents. Similarly, the first-third rule groups 275-277 include at least the first-third rule sets $140_1$-$140_3$. Other groups of analytic rules implemented within the rule priorities data store 260 may include post-processing rules such as remediation rules and/or reporting/alerting rules as described above.

As shown in FIGS. 2A-2B, the rule orders 282 identify salient rules with each rule group 275-278 based on a level of importance as set by an assigned ranking. Stated differently, the assigned rankings are group-specific, and thus, a specific ranking assigned to rules pertaining to one rule group (e.g., fourth rule group 279) has no effect on any rankings assigned to rules within another rule group (e.g., any of rule groups 275-277). The rule prioritization logic 180 may alter the assigned rankings to rules within each rule group based on the metadata provided to the management system 120. For example, the rule prioritization logic 180 may alter the rankings assigned to different analytic rules with the fourth rule group 278 based on the metadata $160_4$ provided by the endpoint $110_2$ as well as other endpoints with software agents communicatively coupled to the management system 120.

The rule weightings 284 also may be used to identify salient rules with each rule group 275-279. The rule prioritization logic 180 may alter the assigned weightings to rules within each rule group 275-278 based on the metadata. Sometimes, the rule weighting $284_1$ . . . or $284_R$ has a direct correlation with the severity of a potential cyberattack in response to a rule activation (also referred to as a "rule violation"). Hence, a cyber-security engine may conclude that the suspect object is a cyber-security threat based only on a few rule violations, provided these rule violations are directed to at least one analytic rule that, upon detection, is sufficient to exceed an applicable likelihood threshold. Depending on the selected implementation, any updates by the rule prioritization logic 180 to the stored weighting metadata for one or more analytic rules (e.g., fourth rule group 278) may warrant a change in processing order of these updated rules $280_{R-9}$-$280_R$, represented as R1 $280_{R-9}$ through R10 $280_R$. These updated rules may also be reordered by the rule prioritization logic 180 or by the cyber-security engine upon receiving the updated rules with the changed weighting via rule priority messages $185_1$-$185_N$.

The frequencies of reporting 286 may be used to assist in identify salient rules within each rule group 275-278. The rule prioritization logic 180 receives the priority control messages including the metadata $160_1$-$160_4$, which includes an identifier associated with each of the rules implicated in prior detections. Responsive to the same rules being involved in the detection of potential cyber-security attacks, which may be determined by matching identifiers within the incoming metadata to identifiers $288_1$-$288_R$ stored within the rule priorities data store 260, the corresponding frequencies of reporting $286_1$-$286_R$ is updated (e.g., incremented). Responsive to the same rules being involved in the detection of potential cyber-security attacks, the rule prioritization logic 180 may determine that these rules are "salient" rules and alter the processing order of these rules accordingly.

Additionally, as an optional embodiment as shown in FIG. 2C, one or more of the rule group 275 . . . and/or 278 may be further organized into two or more rule subgroups 290 and 292. These rule subgroups 290 and 292 may enable further prioritization of the analytic rules $280_{R-9}$-$280_R$ based on one or more factors, which may pertain to characteristics of the network devices (e.g., geographic location, properties directed to hardware and/or software configurations, etc.) and/or the subscriber(s) associated with the network devices uploading priority control messages to the management system 120. Such information may be extracted from content of the uploaded priority control messages (e.g., IP source address) or from content within a software profile completed by the subscriber at registration. From this information, the rule prioritization logic 180 may be able to determine the industry, government or other subscriber category, and/or geography of the network device supplying the priority control message and create subgroups therefrom. Herein, the rule prioritization logic 180 would assign additional priorities (e.g., order and/or weighting) pertaining to that rule subgroup.

Referring back to FIG. 2A, the administrative interface 125 is a portal that allows, after credential exchange and authentication, an administrator access to the contents of rule priorities data store 260. For instance, the administrative interface 125 may provide a graphics user interface (GUI) that allows an authenticated user to override or influence the order and/or weighting assigned to the analytic rules $280_1$-$280_R$ maintained within the priorities data store 260. This provides the administrator with an ability to customize the reprioritized rule sets to ensure that certain rules, which are viewed by the administrator as important, are retained as salient rules. The rule selection by the administrator may be supported by the rule prioritization logic 180 generating a suggested listing of analytic rules, where the suggested listing may be based on predicted threat severity (high, medium, low) and/or probability of occurrence (high, medium, low), e.g., with respect to the particular subscriber, subscriber category and corresponding threat landscape. The administrator may manually alter the rule prioritization included in the suggested listing to customize the reprioritization of rules to particular cyber-security threat concerns by the administrator.

Additionally, the administrative interface 125 may enable an authenticated user to alter (e.g., modify or change) the prioritization scheme currently utilized by the rule prioritization logic 180. As a result, the administrative interface 125 enables the user to adjust what parameters are considered (and the degree of reliance on such parameters) by the rule prioritization logic 180 in reprioritizing stored analytic rules. This alteration of the rule prioritization logic 180 may allow the authenticated user to bias prioritization of the stored analytic rules within each rule group to produce "salient" rules which may be different from the salient rules produced by the rule prioritization logic 180 prior to alteration.

C. Network Device—Endpoint Deployment

Figure 3:
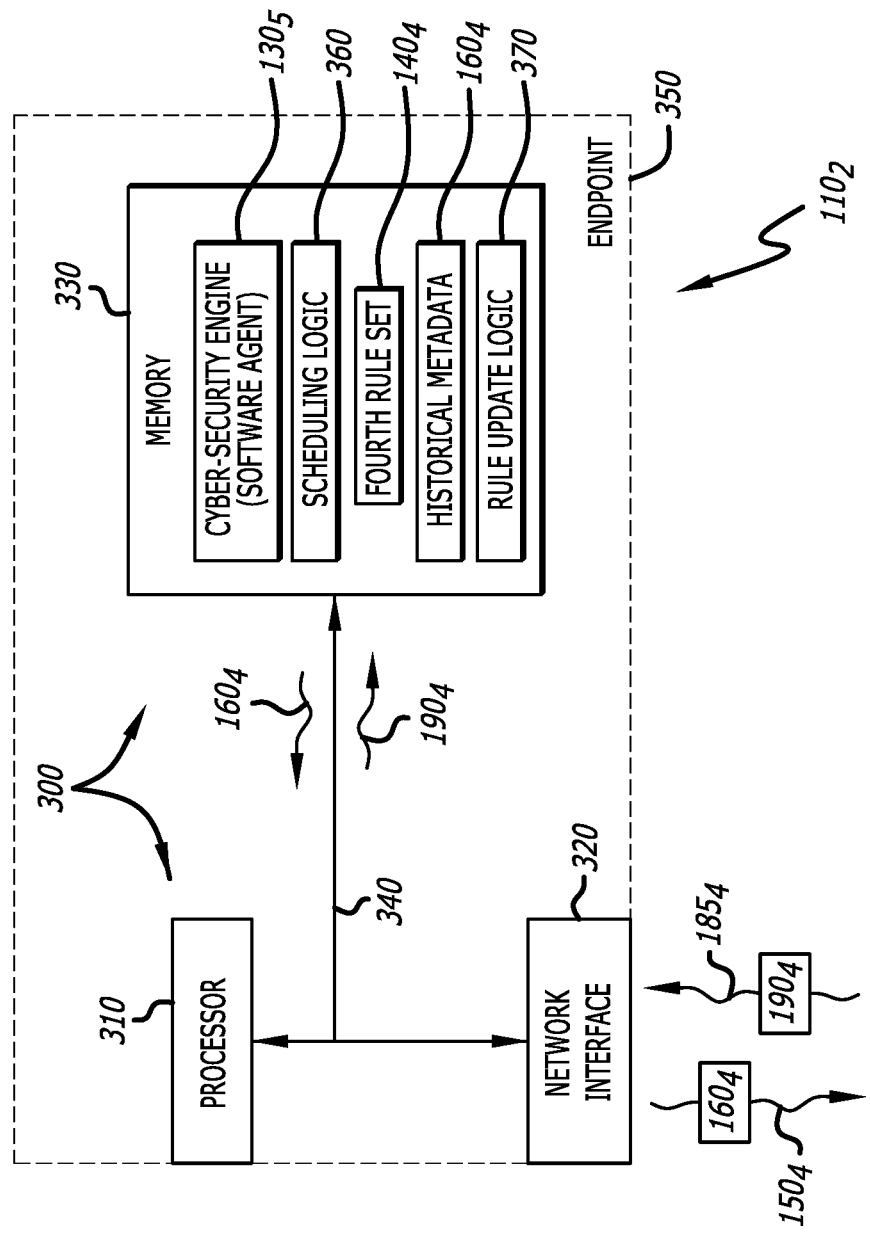
FIG. 3 is an exemplary embodiment of a logical representation of a network device implemented as an endpoint including a cyber-security engine operating as a software agent that performs cyber-security operations on incoming objects and communicates the results of such operations to the management system of FIG. 1.

Referring to FIG. 3, an exemplary embodiment of a logical representation of a network device (e.g., network device $110_2$) of FIG. 1 is shown. Herein, for this embodiment, the network device $110_2$ operates as an endpoint, including a plurality of components 300, including a processor 310, a network interface 320 and a memory 330, which are communicatively coupled together via a transmission medium 340. As shown, when deployed as a physical device, the components 300 may be at least partially encased in a housing 350. As a virtual device, however, the network device $110_2$ is directed to some or all of the logic within the memory 330.

Herein, the processor 310 is a multi-purpose, programmable component such as a CPU, DSP or other programmable component as described above in reference to the processor 210 shown in FIG. 2A. The memory 330 may be implemented as persistent storage, including the cyber-security engine $130_4$ that, upon execution on the processor 310, operates as a daemon software agent by conducting a run-time analysis of received objects for any benign or malicious behaviors. The malicious behaviors may be based on detection of one or more indicators of compromise (IOCs), namely unauthorized, anomalous, unintended and/or unwanted behavior that may signal a potential cyberattack. The operability of the software agent $130_4$ is controlled by a plurality of analytic rules corresponding to the fourth rule set $140_4$ stored in the memory 330.

The memory 330 further includes scheduling logic 360 that, upon execution by the processor 310, specifies the order of processing of the plurality of analytic rules forming the fourth rule set $140_4$. According to one embodiment of the disclosure, at initial start-up, the scheduling logic 360 sets the processing order of the plurality of analytic rules to a default order. The default order may be a factory setting that represents a preferred order of analysis as to compliance with the plurality of analytic rules of the fourth rule set $140_4$.

While processing objects and evaluating the behaviors of the objects in accordance with the default-ordered, analytic rules, the software agent $130_4$ may collect historical metadata associated with the processing of the rules (e.g., object identifiers, verdicts computed for the objects, false negative and false negative count, resource usage, identifiers for each rule involved in a successful detection of an object, source address of the object, etc.). The historical metadata is locally stored as part of the metadata $160_4$.

Responsive to a triggering event, which may be based on periodic or aperiodic (ad hoc or on demand) messaging from the management system (not shown) or an occurrence of an event by the network device $110_4$ (e.g., metadata $160_2$ exceeds a prescribed size), rule update logic 370 within the network device $110_2$ generates and transmits one or more priority control messages $150_4$, including the metadata $160_2$, to the management system 120 via the network interface 320. In response to the priority control message(s) $150_4$, depending on the content of the metadata $160_2$, the network device $110_2$ may receive one or more priority messages $185_4$, which may include the rule recommendations $190_4$. The rule update logic 370 extracts the rule recommendations $190_4$ and modifies the stored default ordering information to reprioritize (e.g., reorder and/or re-weight) the processing order of the analytic rules forming the fourth rule set $140_4$. Additionally, or in the alternative, the rule recommendations $190_4$ may cause one or more analytic rules may be added or removed from the fourth rule set $140_4$. Thereafter, the scheduling logic 360 signals the cyber-security engine $130_4$ to perform analyses of incoming objects for benign or malicious behaviors in accordance with the reprioritized processing order of analytic rules of the fourth rule set $140_4$.

D. Network Device—Appliance Deployment

Figure 4:
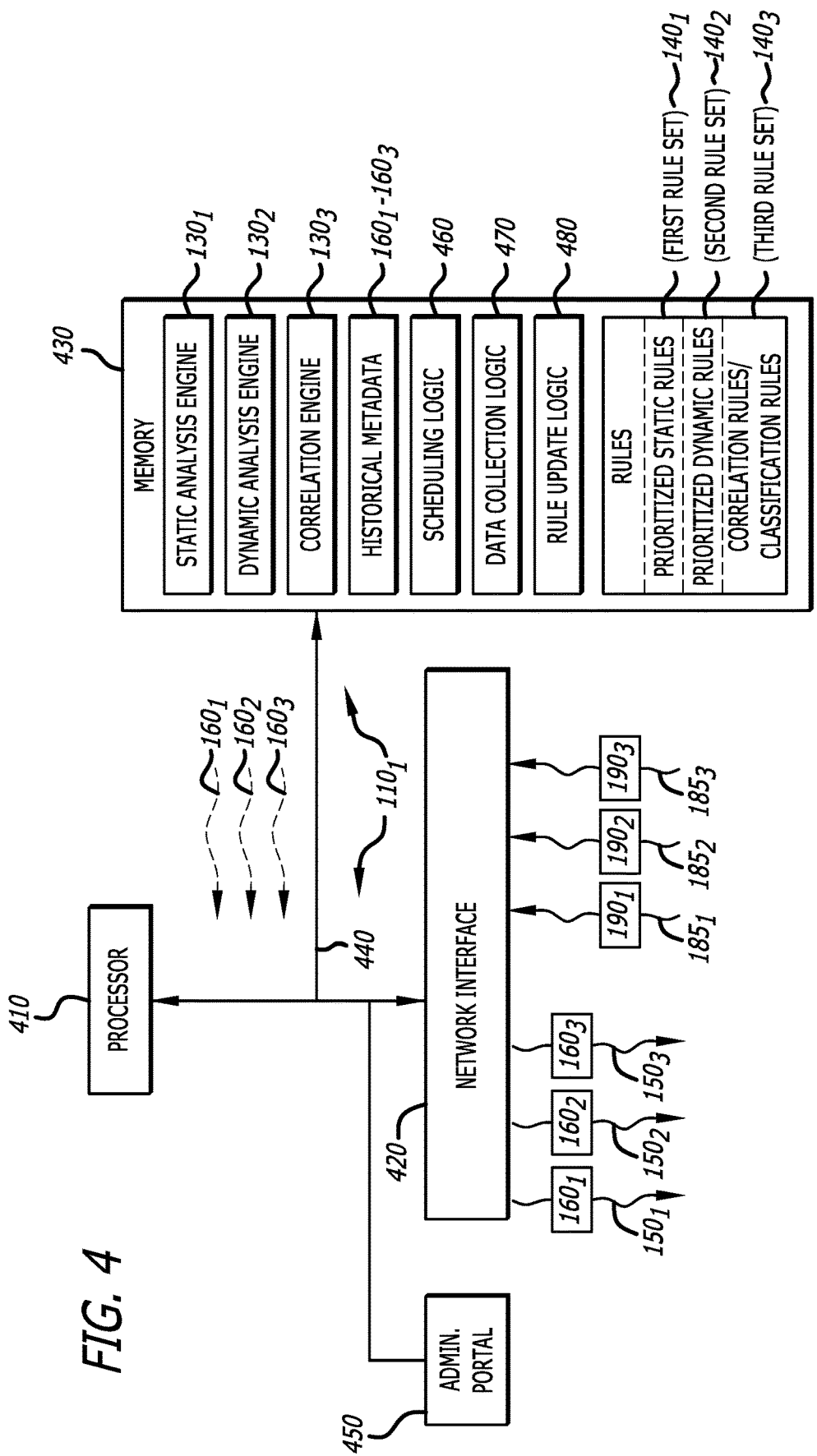
FIG. 4 is an exemplary embodiment of a logical representation of a network device implemented as a cyber-security appliance including multiple cyber-security engines that perform cyber-security operations on incoming objects and communicate the results of such operations to the management system of FIG. 1.

Referring to FIG. 4, an exemplary embodiment of a logical representation of a cyber-security appliance (e.g., network device $110_1$) of FIG. 1 is shown. Herein, deployed as a physical device or as a virtual device, the network device $110_1$ may be configured to operate as a cyber-security appliance, including a plurality of components 400, including a processor 410, a network interface 420 and a memory 430, which are communicatively coupled together via a transmission medium 440. Additionally, the plurality of components 400 further comprises an administrative portal 450 that enables authorized access to contents of the memory 430. The administrative port 450 permits different types of rules to be altered (e.g., modified, deleted, or added).

As described above, the processor 410 is a multi-purpose, programmable component such as a CPU, DSP or other programmable component as described above in reference to the processor 310 shown in FIG. 3. The memory 430 may include multiple cyber-security engine $130_1$-$130_3$, where the operability of the cyber-security engine $130_1$-$130_3$ is controlled by programmable rule sets and the cyber-security engine $130_1$-$130_3$ collectively operate to detect a potential cyberattack. Example of the cyber-security engine $130_1$-$130_3$ may include static analysis engine, dynamic analysis engine, correlation/classification logic, and monitors.

The static analysis engine $130_1$, upon execution by the processor 410, is configured to perform a light-weight examination of an object to determine whether that object is suspicious and/or malicious. The static analysis engine $130_1$ may employ analysis techniques, such as heuristics or pattern matching for example, in order to detect unrecognizable or known, malicious characteristics without execution of the object. Herein, the first rule set $140_1$ is stored within the memory 430 and the operations of the static analysis engine $130_1$ are governed, at least in part, by the first rule set $140_1$. As the first rule set $140_1$ is programmable, the static analysis engine $130_1$ may operate differently as prioritization of the analytic rules within the first rule set $140_1$ are changed.

The dynamic analysis engine $130_2$, upon execution by the processor 410, is configured to observe behavior(s) of the object during run-time. The observed behaviors are compared to known malicious behaviors and/or known benign behaviors in efforts to detect whether the object under analysis is associated with a potential cyberattack. According to one embodiment of the disclosure, operability of the dynamic analysis engine $130_2$ may be altered by changing prioritization of the analytic rules of the second rule set $140_2$ that control such operability. Such changes may be accomplished by at least reordering certain analytic rules of the second rule set $140_2$ when certain processing activities performed during object run-time are evaluated by the dynamic analysis engine $130_2$. Additionally, operability of the dynamic analysis engine $130_2$ may be altered by changing what behaviors are being monitored. Alternatively, the behavioral changes may also be accomplished by reprioritizing analytic rules that select what processing activities are being monitored (and the monitoring order). The change in monitoring may alter operability of the dynamic analysis engine $130_2$ and this would alter future processing of rules and analysis/evaluation, or also could be used to re-evaluate past actions under the newly changed dynamic analysis engine 130

The correlation/classification engine $130_3$, upon execution by the processor 410 and operating in accordance with the third rule set $140_3$ stored in the memory 430, is configured to reach a verdict, based on the results from the static analysis engine and/or the dynamic analysis engine, as to whether the object under analysis is part of a potential cyberattack. The reprioritization of one or more analytic rules of the third rule set $140_3$ may alter when certain analyses, corresponding to the reprioritized analytic rules, are conducted by the correlation/classification engine $130_3$. More specifically, the altering the priority of one or more analytic rules of the third rule set $140_3$ may change which analytic rules of the third rule set $140_3$ are considered to be the "salient" rules. This may affect the verdict determined by the correlation/classification engine $130_3$ as the reprioritization may redirect focus on the analyses by the correlation/classification engine $130_3$ on results associated with a different subset of analytic rules of the third rule set $140_3$ than previously considered.

According this embodiment of the disclosure, the correlation/classification engine $130_3$ may operate in concert to reach the verdict, and thus, the correlation rules and the classification rules may be prioritized together as the third rule set $140_3$. Alternatively, given that the correlation engine may deploy a rule set separate from the rule set utilized by the classification engine, and thus, the rule set utilized by the correlation engine may be prioritized separately from the rule set utilized by the classification engine.

The memory 430 further includes scheduling logic 460 that, upon execution by the processor 410, specifies the order of processing for each rule set $140_1$-$140_3$ controlling operations of different cyber-security engines $130_1$-$130_3$. According to one embodiment of the disclosure, at start-up, the scheduling logic 460 sets the processing order of each rule set $140_1$-$140_3$ to an initial order. At this time, each rule set $140_1$-$140_3$ may carry a default priority or in some embodiments, where no priority is defined, may be assigned a rule processing priority (e.g., randomly assigned, based on time of receipt, etc.). While receiving objects, followed by analysis of the content and their behaviors, data collection logic 470 may gather metadata associated with the processing of the rule $140_1$-$140_3$ by the cyber-security engines $130_1$-$130_3$, respectively. The metadata may include, but is not limited or restricted to object identifiers, verdicts computed for the objects, false negative and false negative count, resource usage, identifiers for each rule involved in a successful detection of an object, source address of the object, or the like. The metadata is locally stored as part of the metadata $160_1$.

Responsive to a triggering event, which may be based on periodic or aperiodic messaging from the management system (not shown) or an occurrence of an event by the network device $110_1$ (e.g., metadata $160_1$ exceeds a prescribed size), rule update logic 480 within the network device $110_2$ generates and transmits one or more priority control messages $150_1$ . . . , and/or $150_3$, including respective metadata $160_1$, $160_2$ and/or $160_3$, to the management system 120 via the network interface 420. In response to the priority control message(s) $150_1$, $150_2$ and/or $150_3$, depending on the content of the metadata $160_1$, $160_2$ and/or $160_3$, the network device $110_2$ may receive one or more priority messages $185_1$, $185_2$ and/or $185_3$, which may include the rule recommendations $190_1$, $190_2$ and/or $190_3$.

The rule update logic 480 extracts the rule recommendations $190_1$, $190_2$ and/or $190_3$ and modifies the stored default ordering information to reprioritize (e.g., reorder and/or re-weight) the processing order of the analytic rules forming the corresponding rule set(s) $140_1$, $140_2$ and/or $140_3$. Additionally, or in the alternative, the rule recommendations $190_1$, $190_2$ and/or $190_3$ may cause one or more analytic rules may be added or removed from the corresponding rule set(s) $140_1$, $140_2$ and/or $140_3$. Thereafter, the scheduling logic 460 signals some or all of the cyber-security engines $130_1$-$130_3$ to perform analyses of incoming objects for benign or malicious behaviors in accordance with the reprioritized processing order of analytic rules of the corresponding rule set(s) $140_1$, $140_2$ and/or $140_3$. An illustrative example, similar to the unique binary analysis mentioned above, a new rule could be inserted above other rules if a unique binary analysis determines further processing or enhancement of evaluation should be performed (e.g., by a third party web service or data aggregation source for evaluation or a proprietary sandbox technology) and any of the enhanced evaluations should convict the artifact in question as "known high priority or damaging threat" then this could immediately increase the weighting of the analysis of the artifact, and subsequent unique binaries matching similarity analysis (or other criteria) could similarly be flagged as higher priority in the existing rules.

E. Network Device—Sensor Deployment

Figure 5:
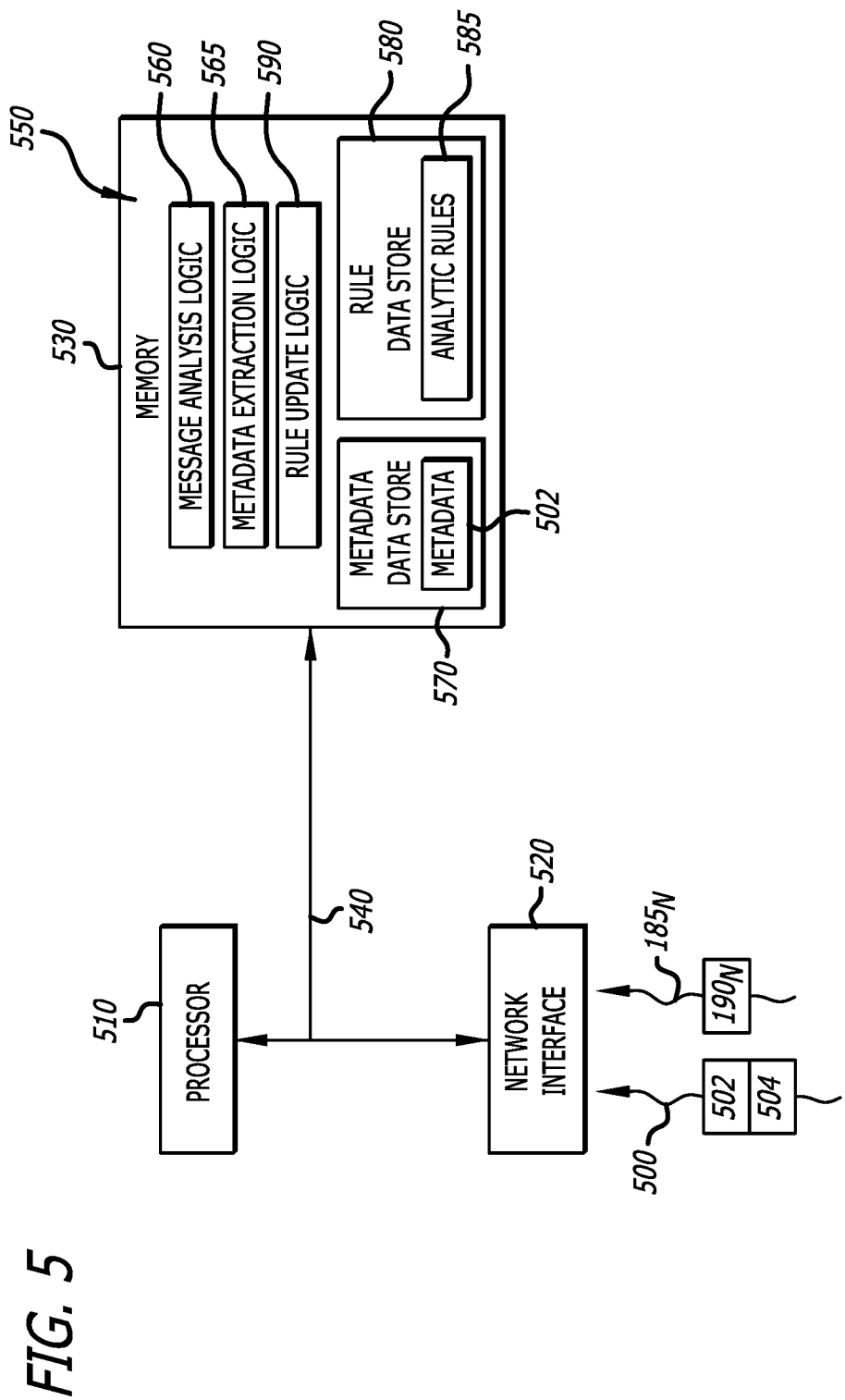
FIG. 5 is an exemplary embodiment of a logical representation of a network device implemented as a sensor including at least one cyber-security engine that performs cyber-security operations on incoming objects and communicates the results of such operations to the management system of FIG. 1.

Referring to FIG. 5, an exemplary embodiment of a logical representation of a sensor (e.g., network device $110_N$) of FIG. 1 is shown. One embodiment of the architecture of the sensor is described in U.S. patent application Ser. No. 15/283,108 filed Sep. 30, 2016, the contents of which are incorporated by reference herein. Similar to the architecture of the endpoint $110_2$ and appliance $110_1$, the sensor $110_N$ may deployed as a physical device or as a virtual device, including a processor 510, a network interface 520 and a memory 530, which are communicatively coupled together via a transmission medium 540.

Herein, the sensor $110_N$ is responsible for evaluating information routed over a network and subsequently providing a data submission, which includes at least a portion of the evaluated information, to a cluster (not shown) for conducting an in-depth malware analysis. A "cluster" is a scalable, threat detection system that includes one or more computing node that analyze suspicious objects received from the sensors. Stated differently, the sensor $110_N$ conducts a preliminary analysis of a received object, which is copied or intercepted during transit over the network, in order to intelligently control the number and/or frequency of data submissions to the cluster for analysis. In some embodiments, the number or frequency of submission of objects for analysis or the number and frequency of analyses may be based on the subscription privileges of the subscriber.

The processor 510 is a multi-purpose, processing component that is configured to execute logic 550 maintained within the persistent storage 530 being non-transitory storage medium. As described below, the logic 550 may include, but is not limited or restricted to, (i) message analysis logic 560, (ii) metadata extraction logic 565, (iii) metadata data store 570, (iii) rule data store 580 including analytic rules 585 that control operability of at least the message analysis logic 560, and (v) rule update logic 590.

As shown, the network interface 520 is configured to receive an incoming message 500, including metadata 502 and the object 504, from a network or via a network tap. The metadata analysis logic 560, executed by the processor 510 and under control by analytic rules 585, may conduct an analysis of at least a portion of the message 500, such as the object 504 for example, to determine whether the object 504 is suspicious. If so, the processor 510 processes the metadata extraction logic 565 that, during such processing, extracts the metadata 502 from the received information 500 and assigns the object identifier for the metadata 502. The metadata 502 may be stored in a metadata data store 570 while the suspicious object 504 may be stored in the same or a separate data store. The metadata 502 may be provided to a queue, accessible by computing nodes within the cluster, to obtain the metadata 502 and recover the object 504 to render a verdict as to whether the object 504 is a potential cyber-security threat. The verdict may be rendered through a variety of threat detection scheme, including threat detection processing as performed by the static analysis engine $130_1$, dynamic analysis engine $130_2$ and/or correlation/classification engine $130_3$ as described above.

Herein, the metadata analysis logic 560 conducts analyses, in accordance with the analytic rules 585, to determine whether the object 504 is suspicious. The metadata analysis logic 560 may employ analysis techniques, such as heuristics or pattern matching for example, in order to analyze the content of the object 504 after execution, during execution, prior to execution while the process is blocked by the system, post-execution, or while the object is at rest, without being executed. Herein, the analytic rules 585, stored within the memory 530, may be reprioritized in response to the rule update logic 590 receiving rule recommendations $190_N$ included as part of the rule priority messages $185_N$ from the management system 120 of FIG. 1. Based on the reprioritization of the analytic rules 585, the metadata analysis logic 560 may operate differently as described above.

IV. Registration

Figure 6A:
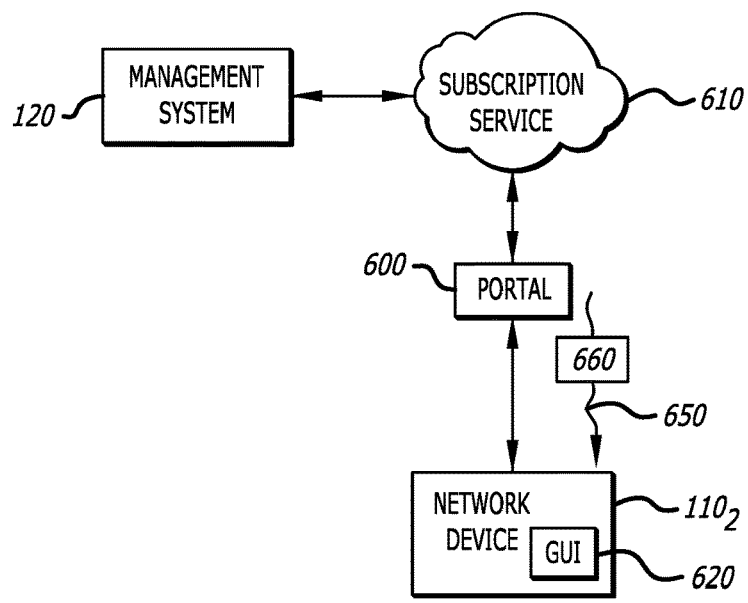
FIG. 6A is an illustrative embodiment of a registration process for a customer to subscribe to the cyber-security protection service of FIG. 1.

Referring now to FIG. 6A, using a portal 600 providing access to a subscription service 610 communicatively coupled to the management system 120, a customer is able to register (subscribe) to services offered by the management system 120. Additionally, via the portal 600, a customer (now "subscriber") may be further able to modify current terms of the subscription selected by the customer (e.g., change subscription level, increase/decrease number of authorized network devices registered with the management system 120, change customer-configured attributes, etc.). By registering and selecting a particular subscription offered by the subscription service 610, the management system 120 maintains a certain metadata pertaining to the subscriber and/or network devices registered by the subscriber that are participating in the cyber-security protection service 100.

Figure 6B:
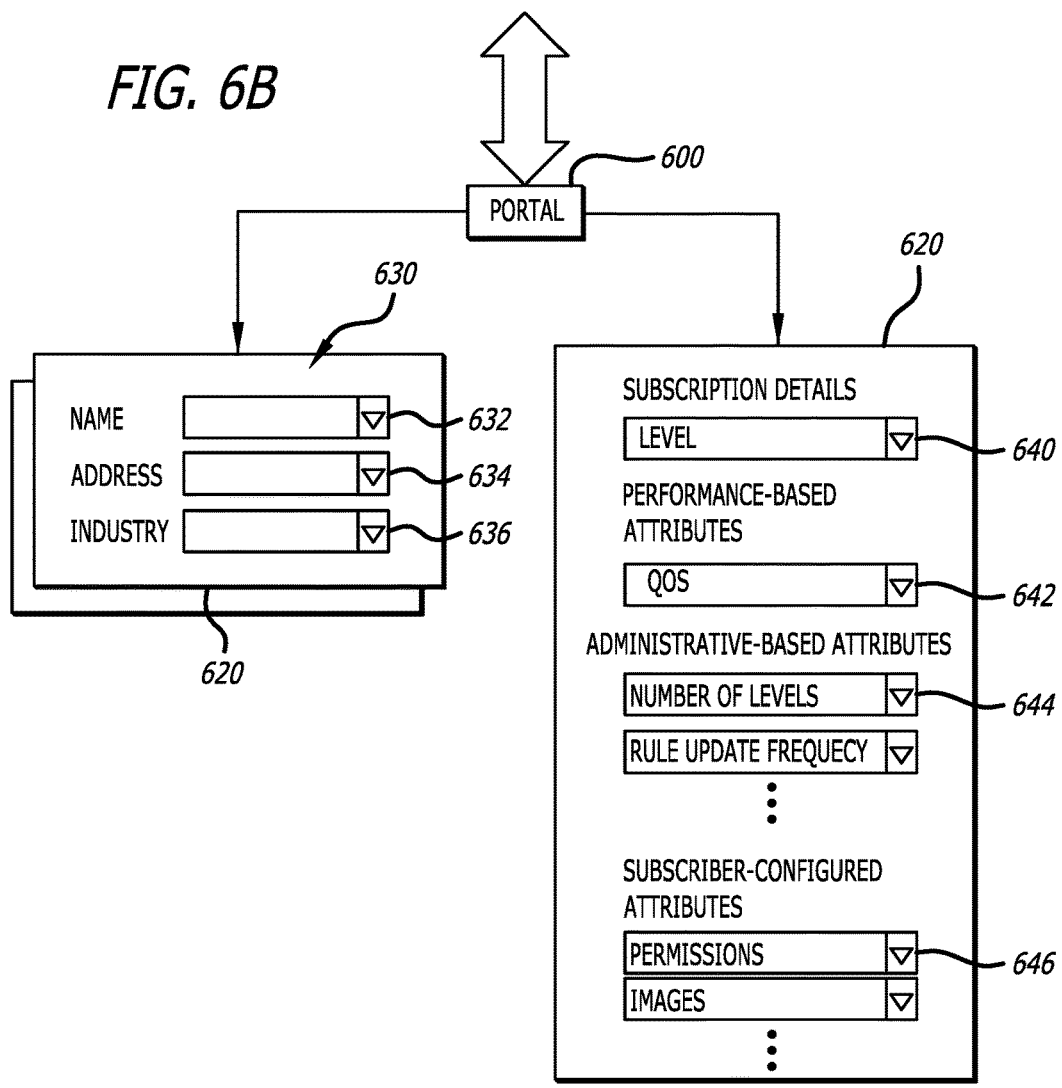
FIG. 6B is an illustrative embodiment of a portal-based interface provided to a customer for web-based registration to the cyber-security protection service of FIG. 1 and formation of a software profile for this new subscriber.

As an illustrative example, as shown in FIG. 6B, the portal 600 may provide a customer with access to one or more webpages 620, which allows a customer to supply customer details 630 (e.g., customer name 632, geographic location(s) 634 for the customer as represented by address or other information, customer's industry 636 that may be represented by a pull-down menu with a listing of high-level industry categories (financial, technology, United States government, etc.) and/or lower level industry subcategories (e.g., banking, brokerage, semiconductor manufacturer, government agency, network infrastructure manufacturer, etc.). The webpages 620 may prompt the customer for such customer details 630 and other information using conventional "user interactive" techniques. These may include a web form, e.g., rendered by a conventional web browser of the customer, including one or more online pages that prompts for and accepts customer input.

The portal 600 may further enable the customer to select a subscription level 640, which may automatically assign certain subscription attributes for the customer's subscription. These subscription attributes may include certain performance-based attributes 642 (e.g., QoS thresholds, throughput thresholds, etc.) and/or administrative-based attributes 644 (e.g., rule update frequency, total number of network device supported, selected rule update scheme being either automated rule updating that requires no administrative confirmation or semi-automated rule updating that requires administrative confirmation before proceeding with the rule update). Also, the portal 600 allows the subscriber to customize the subscription through subscriber-configured attributes 646 (e.g., data analytic geographic permissions or restrictions, special guest image software profiles for use in virtualized processing of objects by cyber-security engines of the network devices, alert rule reprioritization confirmations, etc.).

Referring back to FIG. 6A, upon completing registration (or modification of the subscription) via the portal 600, a message 650 may be provided to a network device (e.g., endpoint, web server, etc.) that is used in the registration process or selected by the customer during the registration process. The message 650 includes at least access credentials 660 that, if installed into a network device utilized by the subscriber (e.g., network device $110_2$), enables the network device $110_2$ to communicate with the subscription service 610 for update the subscription parameters and gain access to one or more user interfaces 670 (e.g., web page(s), graphical user interface(s) "GUI(s)," etc.) that allow an authorized administrator for the subscriber to select rule prioritization procedures for that subscriber.

Figure 6C:
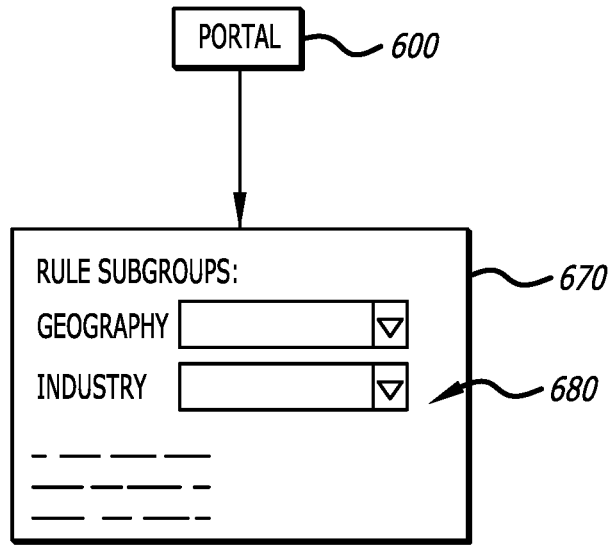
FIG. 6C is an illustrative embodiment of an interactive interface provided to the new subscriber to allow for membership of the subscriber to one or more rule subgroups for further granularity in subsequent reprioritization of analytic rules.

More specifically, as shown in FIG. 6C, responsive to successful access credential authentication, the portal 600 may provide a customer with access to the user interface(s) 670, which allows the subscriber to select one or more rule subgroups 680 to which the subscriber desires membership. The subgroups 680 may be arranged in accordance with any number of factors, including geographic location of the subscriber, subscriber's industry, or the like. Upon selecting one or more of these subgroups, a resultant rule reprioritization generated by the management system 120, in response to one or more rule priority messages received from network device utilized by the subscriber, may differ from rule reprioritizations without designation of the rule subgroup or designation of different rule subgroup(s).

Figure 6D:
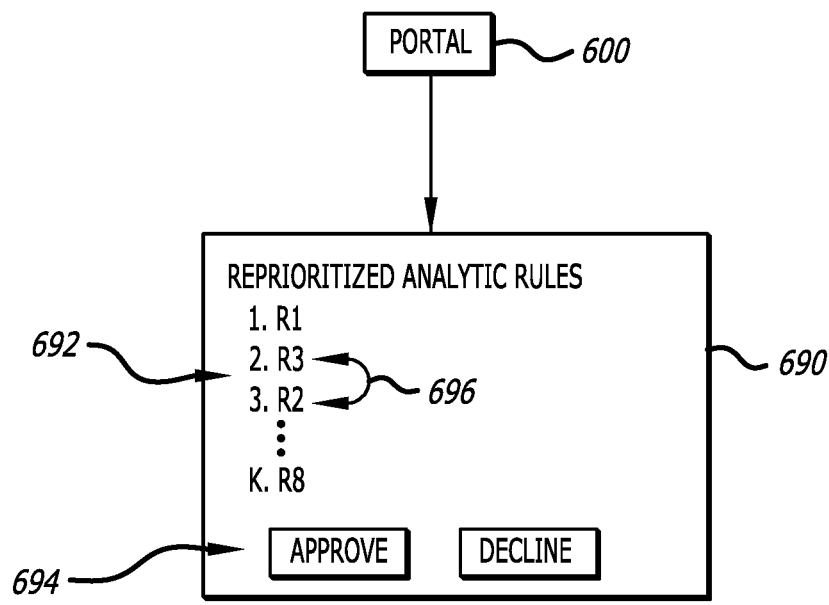
FIG. 6D is an illustrative embodiment of an interactive interface provided to the new subscriber to allow for semi-automated rule updating that requires administrative confirmation before proceeding with the rule update.

Referring now to FIG. 6D, where the subscriber has registered for semi-automated rule updating that requires administrative confirmation before proceeding with the rule update, an alert rule reprioritization confirmation 690 is provided to the network administrator via the portal 600 or through separate band (e.g., text, email, automated phone call, etc.). The alert rule reprioritization confirmation 690 includes a displayable sequence of analytic rules 692 arranged in accordance with a recommended priority scheme (e.g., order, weighting, etc.) and a displayable acknowledgement radio button 694 that, when selected, constitutes administrator approval of the analytic rules 692. Prior to selection of the acknowledgement radio button 694, the analytic rules 692 may be reprioritized by the administrator by repositioning display elements 696 representative of the reprioritized analytic rules rendered on the user interface(s), tagging or re-ranking certain analytic rules that are deemed important to the administrator, or otherwise selecting a different ordering and/or weighting for the reprioritized rules.

Referring to FIG. 7, an illustrative embodiment of the operational flow of the management system 120 in reprioritizing rules controlling operations of a particular cyber-security engine (e.g., software agent) deployed within each of a plurality of network devices (e.g., endpoints $700_1$-$700s$, where S≥2) is shown. Initially, a first rule set 710 (R1, R2, R3, R4, R5, R6, R7, R8, R9, R10) is uploaded to the endpoints $700_1$-$700s$ and made available to the software agents $720_1$-$720s$ operating within the endpoints $700_1$-$700s$ (operation 1). The management system 120 and each of the endpoints $700_1$-$700s$ maintain a transmission protocol to communicate with each other concerning the current rule execution state of the corresponding endpoint $700_1, \ldots ,$ or $700s$.

More specifically, responsive to a periodic or aperiodic triggering event as described above, each of the endpoints $700_1$-$700s$ may transmit corresponding priority messages $730_1$-$730s$ therefrom (operation 2). Each priority message $730_1, \ldots ,$ or $730s$ may include metadata $160_1$-$160s$, which collectively identify potentially "salient" rules 740 (e.g., rules R3, R5, R7 identified in priority message $730_1$) in prior threat detection analytics. These rules 740 (R3, R5, R7) may assist in identifying salient rules for future analyses by the software agents $720_1$-$720s$ reprioritization of the first rule set 710. In fact, by reprioritizing the first rule set 710 where rules R3, R5, R7 are processed earlier (near start of rule set)

than the remaining portion of the rule set (R1, R2, R4, R6, R8, R9, R10), a determination is made whether the reprioritized rule set 750 (R3, R5, R7, R1, R2, R4, R6, R8, R9, R10) reduces the amount of time or processing needed to achieve an outcome. For instance, where the cyber-security engine is directed to the correlation/classification engine or a dynamic analysis engine, the determination may conclude that the amount of analysis (e.g., number of rules processed) or processing time needed before a definitive verdict (non-malicious or malicious being part a potential cyberattack) for an object has been reduced (operation 3).

As further shown in FIG. 7, the reprioritized rule set 750 may be provided to each software agent of a subset of the software agents $720_1$-$720s$ (e.g., software agents $720_1$-$720_2$) to test the effectiveness of the new, reprioritized rule set 750 (operation 4). The software agents $720_1$-$720_2$ apply the reprioritized rule set 750 and monitor the effectiveness of these rules (e.g., # of rules to reach verdict or determination, average processing time before malicious or non-malicious determined, etc.). If the effectiveness of the reprioritized rule 750 is validated, the reprioritized rule set 750 may be downloaded to all of the agents software agents $720_1$-$720s$ or the remainder of the software agents $720_3$-$720s$ (operation 5). This reprioritization scheme is an iterative operation, as the process continues to learn from infected endpoint and/or endpoints that have successfully thwarted cyberattacks, where regardless of state (infected, non-infected), the endpoints are configured to maintain knowledge of the salient analytic rules that defended against or would have protected against infection.

In another variation of the above recursive process, it is contemplated that an "in field beta" feature may aid in developing improve rule orders. As described above, the reprioritized rule set is generated by the management system 120 in response to the received metadata (i.e., meta-information) and provided to the subset of cyber-security engines (e.g., software agents $720_1$-$720_2$) to be utilized in parallel to the first rule set 710 loaded for the software agents $720_1$-$720_2$. The software agents $720_1$-$720_2$ may (i) apply both the current rule ordering set forth in the first rule set 710 and the proposed rule ordering set forth in the reprioritized rule set 750 and (ii) generate meta-information associated with their processing. The meta-information would be communicated to the management system 120 and, if the reprioritized rule set 750 offers improvements over the first rule set 710, the endpoints $700_1$-$'700s$ may be provisioned to load the reprioritized rule set 750 for control operability of the software agents $720_1$-$720s$. Similarly, the results may be used to generate a new proposed optimal ordering responsive to this additional information Herein, different "user groups" within an enterprise or across a number of customers may be assigned different rule sets based on characteristics of the users (e.g., industry, geographical location, etc.), as different types of users may be subjected to different threats. While the different user groups may be assigned different rule orderings, the rule composition may be consistent across user groups even though the processing order may vary. During processing of an object by one or more rule-based cyber-security engines, data associated with the efficacy and/or efficiency of the various rule orderings is collected (e.g., historical metadata) and provided to the management system. The management system 120 assesses the data, and based on the assessment, generates a proposed optimal ordering. In some embodiments, a plurality of proposed optimal orderings may be generated and distributed to either the same user groups or newly generated user groups. This process may repeat until the cyber-security system determines that an optimal efficacy and efficiency has been reached, or in the alternative, may continue with the addition of new rules.

In the foregoing description, the invention is described with reference to specific exemplary embodiments thereof. It will, however, be evident that various modifications and changes may be made thereto without departing from the broader spirit and scope of the invention as set forth in the appended claims.

What is claimed is:

1. A computerized method for generating an improved cyber-security rule ordering for cyber-security threat detection or post-processing activities conducted by a rules-based cyber-security engine deployed within a network device, the method comprising:

analyzing metadata to determine one or more salient rules from a plurality of rules;

based on an analysis of the metadata, reprioritizing the plurality of rules by at least rearranging a processing order of the plurality of rules into a first ordered rule sequence to produce a first rule set, the first rule set including the one or more salient rules being positioned toward a start of the first ordered rule sequence; and providing information associated with the first rule set for use by the cyber-security engine of the network device to perform analyses of incoming data received by the network device in accordance with the first rule set in (i) detecting whether the received data constitutes the potential cyber-security threat or (ii) performing the post-processing activities.

2. The computerized method of claim 1, wherein the post-processing activities include reporting results produced by the rule-based cyber-security engine.

3. The computerized method of claim 1, wherein the performing of the analyses of the incoming data in accordance with the first ordered rule sequence increases efficiency of the cyber-security engine by reducing an amount of resources needed by the cyber-security engine to determine whether the incoming data is malicious or non-malicious from an amount of resources needed in determining whether the incoming data is malicious or non-malicious in accordance with the first ordered rule sequence.

4. The computerized method of claim 1, wherein the reprioritizing of the plurality of rules including the rearranging of the processing order of the plurality of rules according to the first ordered rule sequence is conducted by prioritization logic automatically generating a reordering of one or more rules of the plurality of rules to produce the first ordered rule sequence.

5. The computerized method of claim 1, wherein the cyber-security engine is a software agent deployed within a network device and the plurality of rules control operability of the software agent in analyses of the incoming data to determine whether the incoming data is a cyber-security threat.

6. The computerized method of claim 5, wherein the providing of the information associated with the first rule set comprises returning the first rule set to a first plurality of software agents including the rules-based cyber-security engine to collect meta-information associated with analyses by the first plurality of software agents on the incoming data to determine improved efficacy or efficiency in the analyses of the incoming data by the cyber-security engine using the first rule set.

7. The computerized method of claim 6, further comprising:
providing information associated with the first rule set to a second plurality of software agents upon confirmation, based on the meta-information, that the first plurality of software agents are experiencing improved efficacy or efficiency in the analyses of the incoming data, the first plurality of software agents being a subset of the second plurality of software agents.

8. The computerized method of claim 1 further comprising:
subscribing to a cyber-security protection service that gathers the metadata based on cyber-security threat detection analytics performed by the rules-based cyber-security engine deployed within at least the network device.

9. The computerized method of claim 1, wherein the analyzing of the metadata is conducted (i) after execution, (ii) during execution, (iii) prior to execution while the process is blocked by the system, (iv) post-execution, or (v) while the object is at rest, without being executed.

10. A non-transitory storage medium comprising:
a rule priorities data store configured to maintain analytic rules that control operability of cyber-security engines installed in remotely located network devices; and
rule prioritization logic configured to (i) receive metadata based on cyber-security threat analyses performed by a rule-based cyber-security engine operating in accordance with a first rule set, (ii) evaluate the metadata to determine one or more salient rules from a plurality of analytic rules forming the first rule set, (iii) generate a second rule set by reprioritizing one or more of the plurality of analytic rules within the first rule set from a first ordered rule sequence into a second ordered rule sequence differing from the first ordered rule sequence, the second rule set including the one or more salient rules being positioned toward a start of the second ordered rule sequence, and (iv) provide information associated with the second rule set for use by the rule-based cyber-security engine in conducting further cyber-security threat analyses.

11. The non-transitory storage medium of claim 10, wherein the second ordered rule sequence includes each of the plurality of analytic rules included in the first ordered rule sequence.

12. The non-transitory storage medium of claim 10, wherein the rule prioritization logic is further configured to receive the metadata by a second network device different than a first network device including the rule-based cyber-security engine.

13. The non-transitory storage medium of claim 10, wherein the information associated with the second rule set, when used by the rule-based cyber-security engine, controls analyses on incoming data for detecting whether the incoming data is malicious or non-malicious while achieving at least improved efficiency in the analyses of the incoming data over prior analyses by the rule-based cyber-security engine as controlled by the first rule set.

14. The non-transitory storage medium of claim 10, wherein the rule prioritization logic generates the second rule set automatically based on information extracted from the metadata.

15. The non-transitory storage medium of claim 12, wherein the rule-based cyber-security engine is a software agent deployed within the first network device and the second rule set controls operability of the software agent in analyses of incoming data to determine whether the incoming data is a cyber-security threat.

16. The non-transitory storage medium of claim 10, wherein the rule prioritization logic to provide information associated with the second rule set by at least providing the second rule set to one or more cyber-security engines deployed within one or more network devices, including a network device including the rules-based cyber-security engine, in order to collect meta-information associated with analyses by the one or more network devices using both the first rule set and the second rule set to determine improved efficacy or efficiency in the analyses of the incoming data using the second rule set over the first rule set.

17. The non-transitory storage medium of claim 16, wherein the rule prioritization logic at least further providing the second rule set to a plurality of cyber-security engines upon confirmation, based on the meta-information associated with analyses by the one or more network devices using both the first rule set and the second rule set, that the one or more cyber-security engines are experiencing improved efficacy or efficiency in the analyses of the incoming data, the one or more cyber-security engines being a subset of the plurality of cyber-security engines.

18. The computerized method of claim 1, wherein the post-processing activities include performing remediation activities.

19. A management system comprising:
a processor; and
a non-transitory storage medium communicatively coupled to the processor, the non-transitory storage medium comprises
a rule priorities data store, and
rule prioritization logic configured to (i) receive metadata based on cyber-security threat analyses performed by a rule-based cyber-security engine operating in accordance with a first rule set, (ii) evaluate the metadata to determine one or more salient rules from a plurality of analytic rules forming the first rule set, and (iii) generate a second rule set by reprioritizing one or more of the plurality of analytic rules within the first rule set from a first ordered rule sequence into a second ordered rule sequence differing from the first ordered rule sequence, the second rule set including the one or more salient rules being positioned toward a start of the second ordered rule sequence,
wherein the second rule set is stored within the rule priorities data store for use by a rule-based cyber-security engine in conducting further cyber-security threat analyses.

20. The management system of claim 19, wherein the second rule set, when used by the rule prioritization logic, controls analyses by the rule-based cyber-security engine on the incoming data in detecting whether the incoming data is malicious or non-malicious while achieving at least improved efficiency in the analyses of the incoming data over prior analyses by the rule-based cyber-security engine as controlled by the first rule set.

* * * * *